(12) United States Patent
Yamada

(10) Patent No.: US 7,979,270 B2
(45) Date of Patent: Jul. 12, 2011

(54) SPEECH RECOGNITION APPARATUS AND METHOD

(75) Inventor: Keiichi Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 838 days.

(21) Appl. No.: 11/945,591

(22) Filed: Nov. 27, 2007

(65) Prior Publication Data

US 2008/0133225 A1   Jun. 5, 2008

(30) Foreign Application Priority Data

Dec. 1, 2006 (JP) ................ P2006-325780

(51) Int. Cl.
*G10L 19/14* (2006.01)
(52) U.S. Cl. ................................. 704/205
(58) Field of Classification Search .......... 704/205, 704/268
See application file for complete search history.

(56) References Cited

U.S. PATENT DOCUMENTS

| 5,694,520 | A | 12/1997 | Lyberg |
| 5,806,033 | A | 9/1998 | Lyberg |
| 5,995,924 | A | 11/1999 | Terry |
| 2006/0057545 | A1* | 3/2006 | Mozer et al. ............. 434/156 |
| 2007/0276659 | A1 | 11/2007 | Yamada |

FOREIGN PATENT DOCUMENTS

| EP | 0 749 109 A2 | 12/1996 |
| JP | 4-66999 | 3/1992 |
| JP | HEI 4-288600 | 10/1992 |
| JP | HEI 07-261778 | 10/1995 |
| JP | HEI 10-133693 | 5/1998 |
| JP | 2006-084664 | 3/2006 |
| JP | 2006-154632 | 6/2006 |

OTHER PUBLICATIONS

Wu C-H et al., "Integration of Phonetic and Prosodic Information for Robust Utterance Verification", IEE Proceedings: Vision, Image and Signal Processing, Institution of Electrical Engineers, GB, vol. 147, No. 1, Feb. 18, 2000, pp. 55-61.
European Search Report from European Patent Office dated Mar. 14, 2008, for Application No. 07254504.9-1224, 7 pages.

* cited by examiner

*Primary Examiner* — Jakieda R Jackson
(74) *Attorney, Agent, or Firm* — Finnegan, Henderson, Farabow, Garrett & Dunner, LLP

(57) ABSTRACT

Disclosed herein is a voice processing apparatus for recognizing an input voice on the basis of a prosody characteristic of said voice, said voice processing apparatus including: voice acquisition means for acquiring said input voice; acoustic analysis means for finding a relative pitch change on the basis of a frequency-direction difference between a first frequency characteristic seen at each frame time of said input voice acquired by said voice acquisition means and a second frequency characteristic determined in advance; and prosody recognition means for carrying out a prosody recognition process on the basis of said relative pitch change found by said acoustic analysis means in order to produce a result of said prosody recognition process.

6 Claims, 30 Drawing Sheets

F I G . 2
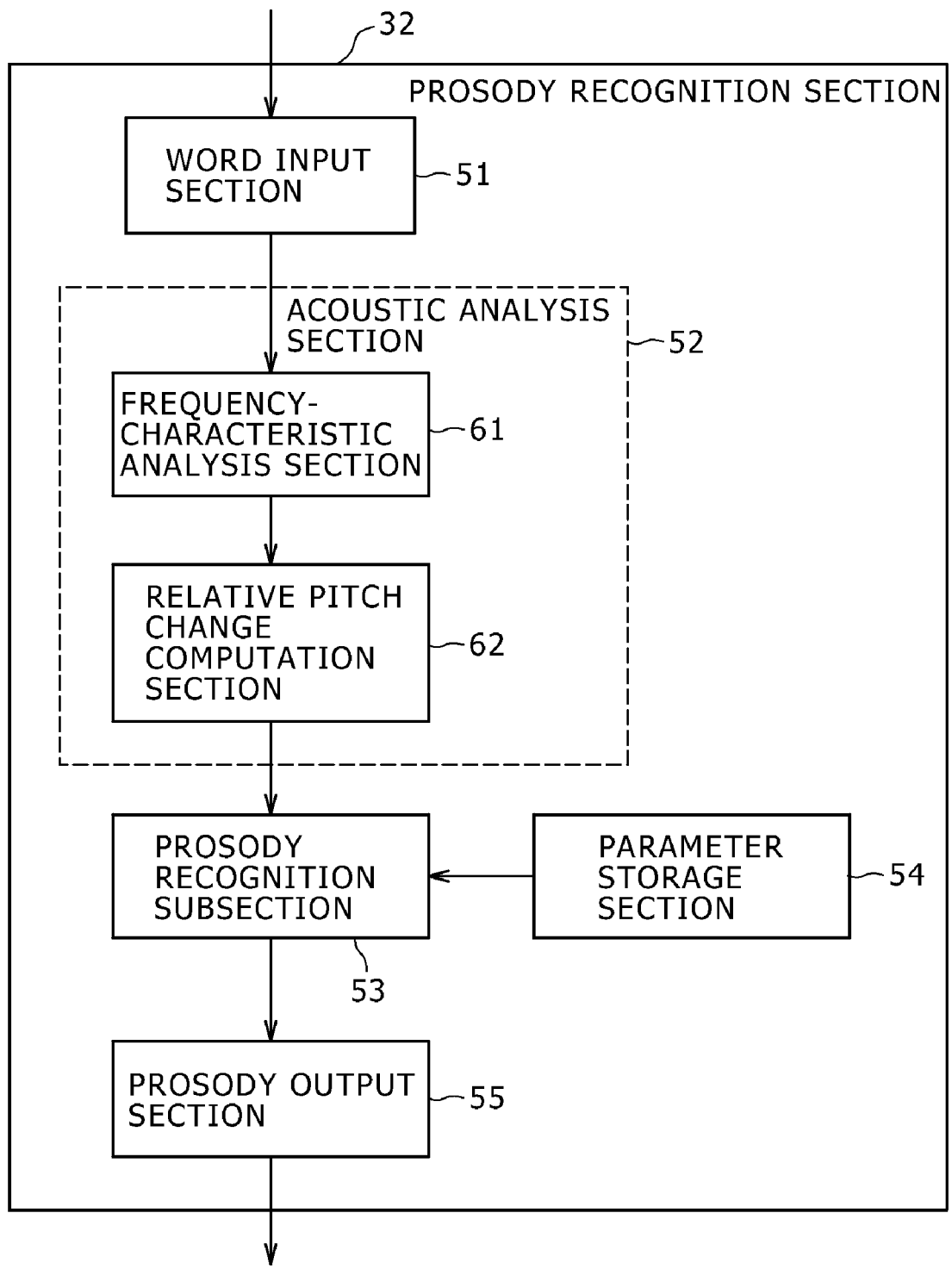

FIG.10

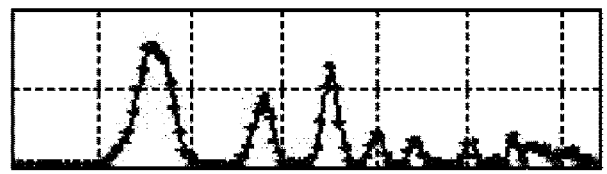
FREQUENCY CHARACTERISTIC A

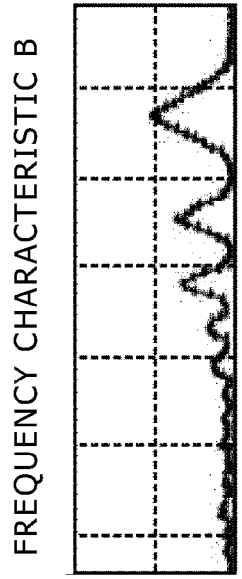

$$\begin{pmatrix} x_1, & x_2, & \bullet & \bullet & \bullet & ,x_N \end{pmatrix}$$

$$\begin{Bmatrix} y_1 \\ y_2 \\ \bullet \\ \bullet \\ \bullet \\ y_N \end{Bmatrix} \begin{Bmatrix} m_{11} & m_{12} & \bullet & \bullet & \bullet & m_{1N} \\ m_{21} & m_{21} & \bullet & \bullet & \bullet & m_{2N} \\ \bullet & \bullet & \bullet & & & \\ \bullet & \bullet & & & \bullet & \\ \bullet & \bullet & & \bullet & & \\ m_{N1} & m_{N2} & \bullet & \bullet & \bullet & m_{NN} \end{Bmatrix}$$

FIG.12

FREQUENCY CHARACTERISTIC A

$$\begin{pmatrix} & x_1, & x_2, & \bullet & \bullet & \bullet & ,x_N \end{pmatrix}$$

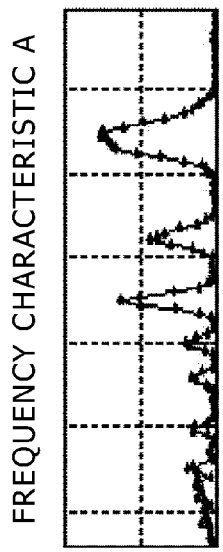 $\begin{Bmatrix} x_1 \\ x_2 \\ \bullet \\ \bullet \\ \bullet \\ x_N \end{Bmatrix}$ $\begin{Bmatrix} m_{11} & m_{12} & \bullet & \bullet & \bullet & m_{1N} \\ m_{21} & m_{21} & \bullet & \bullet & \bullet & m_{2N} \\ \bullet & \bullet & \bullet & & & \\ \bullet & \bullet & & \bullet & & \\ \bullet & \bullet & & & \bullet & \\ m_{N1} & m_{N2} & \bullet & \bullet & \bullet & m_{NN} \end{Bmatrix}$

FREQUENCY CHARACTERISTIC A

VOICE WAVEFORM

REAL PITCH PATTERN

RELATIVE PITCH PATTERN

VOICE WAVEFORM

REAL PITCH PATTERN

RELATIVE PITCH PATTERN

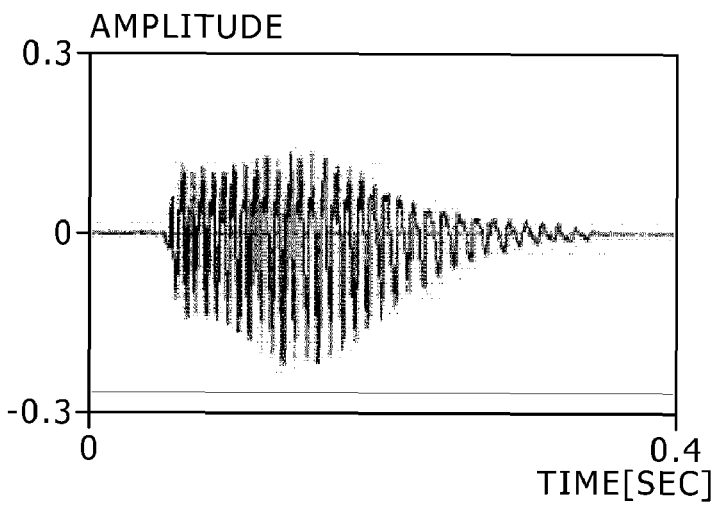
FIG.20A VOICE WAVEFORM
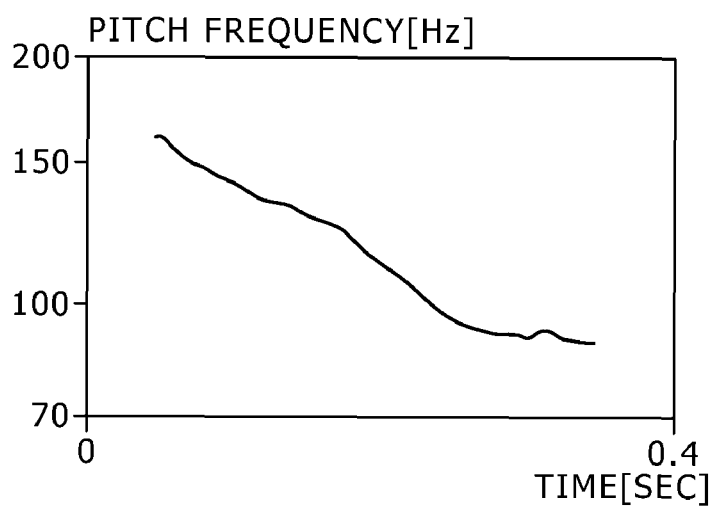
FIG.20B REAL PITCH PATTERN
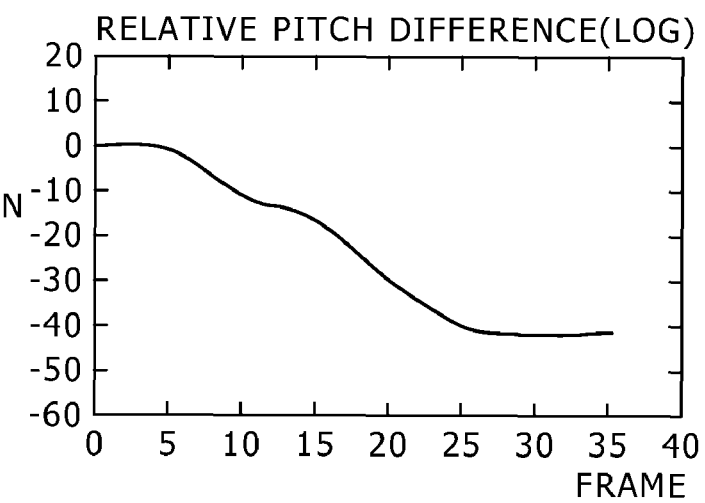
FIG.20C RELATIVE PITCH PATTERN

VOICE WAVEFORM

REAL PITCH PATTERN

RELATIVE PITCH PATTERN

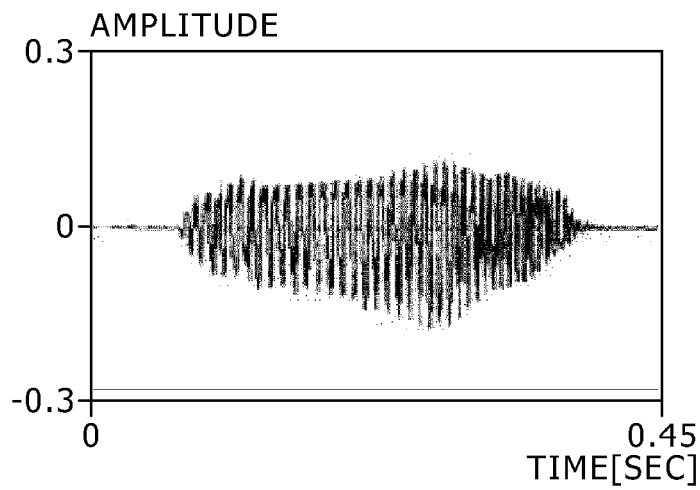
FIG.22A VOICE WAVEFORM
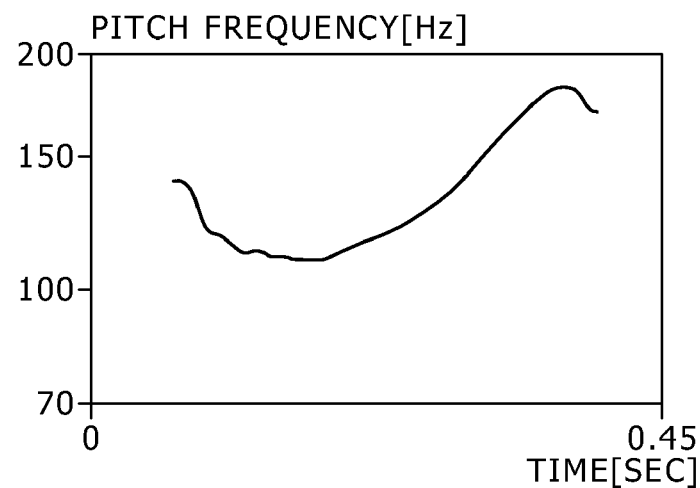
FIG.22B REAL PITCH PATTERN
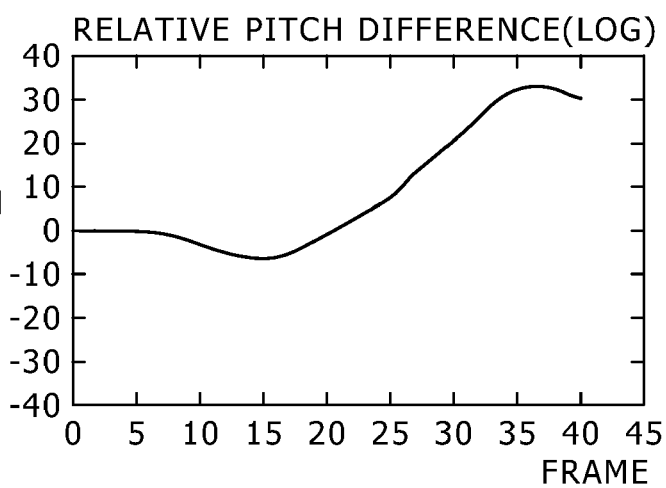
FIG.22C RELATIVE PITCH PATTERN

VOICE WAVEFORM

SPECTROGRAM

RELATIVE PITCH PATTERN

VOICE WAVEFORM

SPECTROGRAM

RELATIVE PITCH PATTERN

VOICE WAVEFORM

SPECTROGRAM

RELATIVE PITCH PATTERN

FIG.28
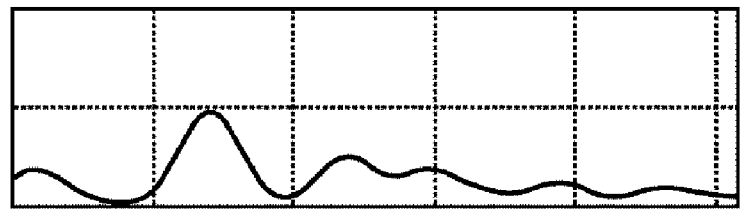
FREQUENCY CHARACTERISTIC FOR
A FRAME NUMBER OF 59
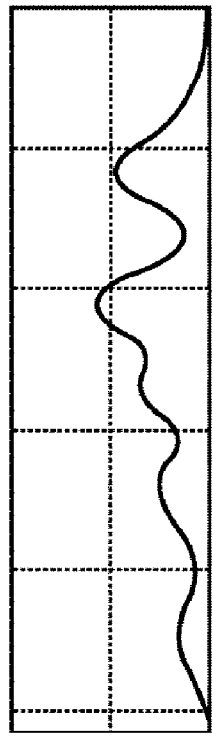
FREQUENCY CHARACTERISTIC FOR
A FRAME NUMBER OF 68
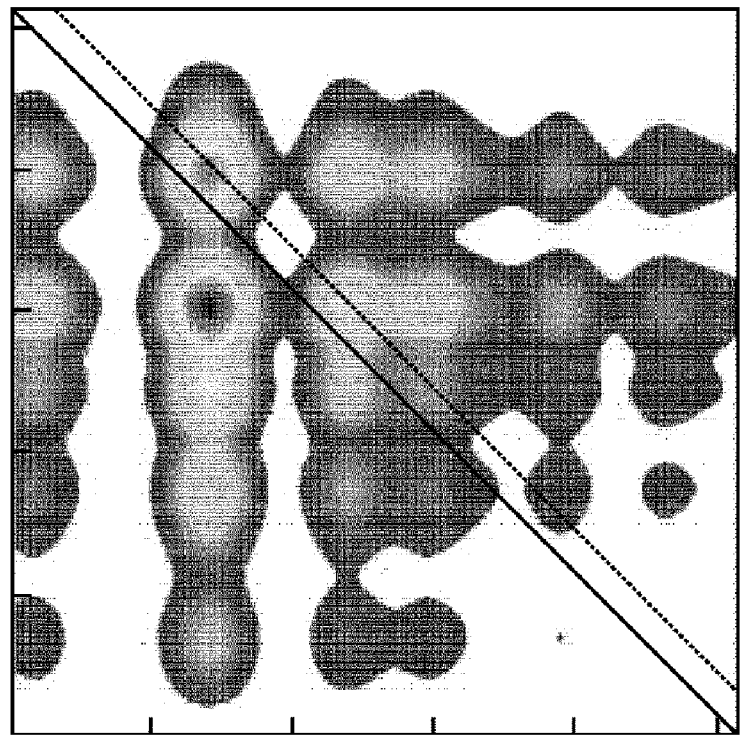

FIG.29
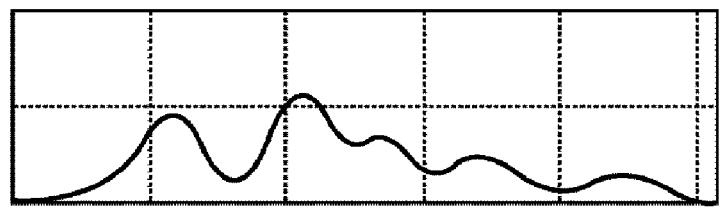
FREQUENCY CHARACTERISTIC FOR
A FRAME NUMBER OF 68
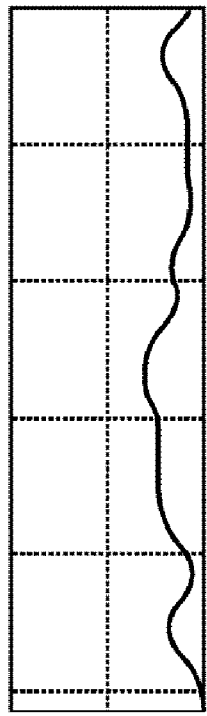
FREQUENCY CHARACTERISTIC FOR
A FRAME NUMBER OF 77
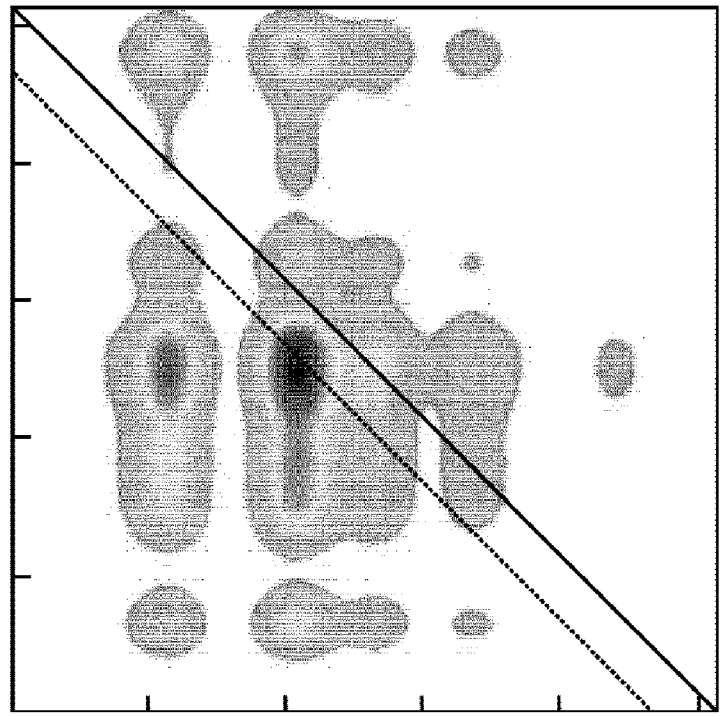

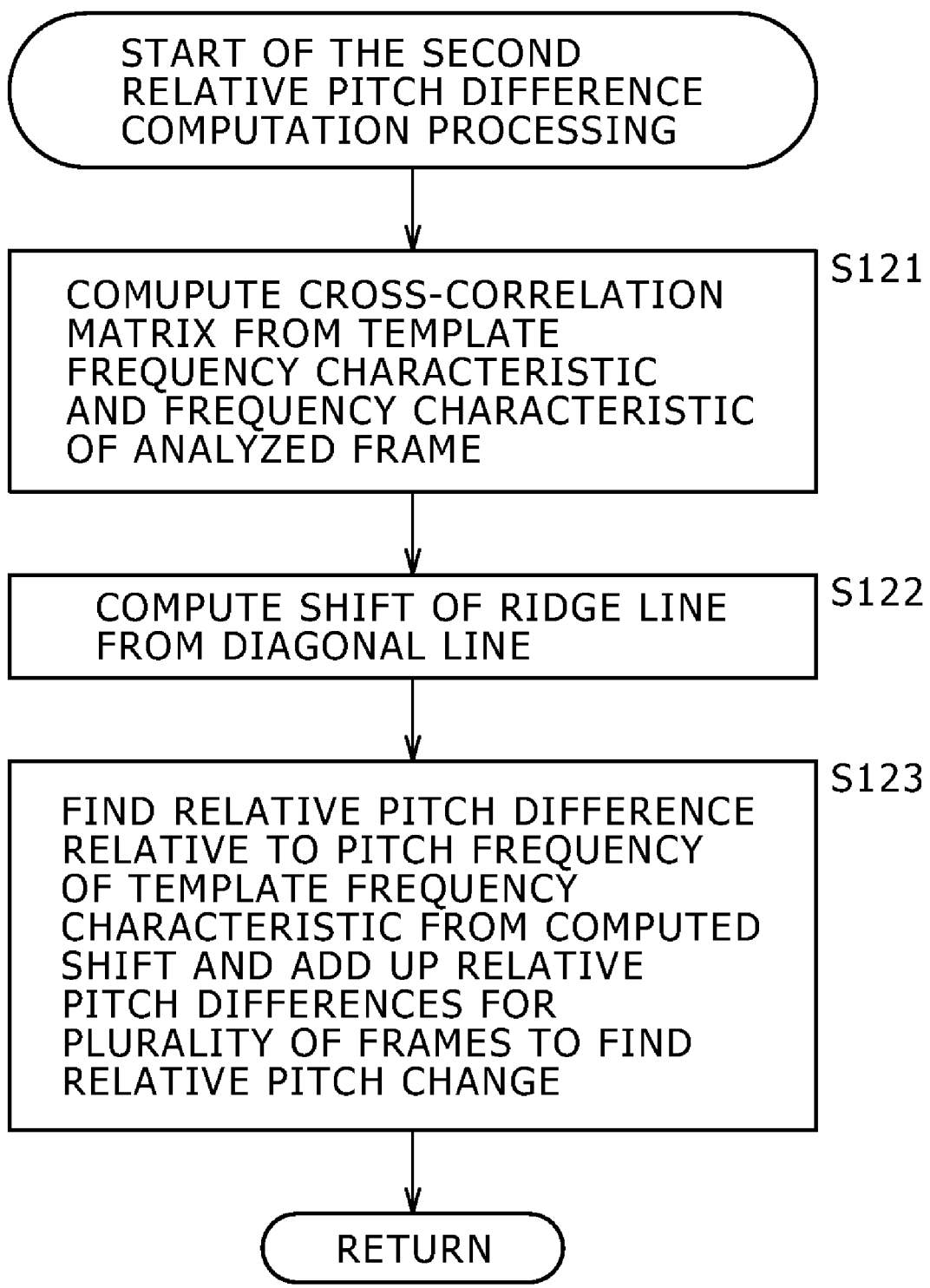

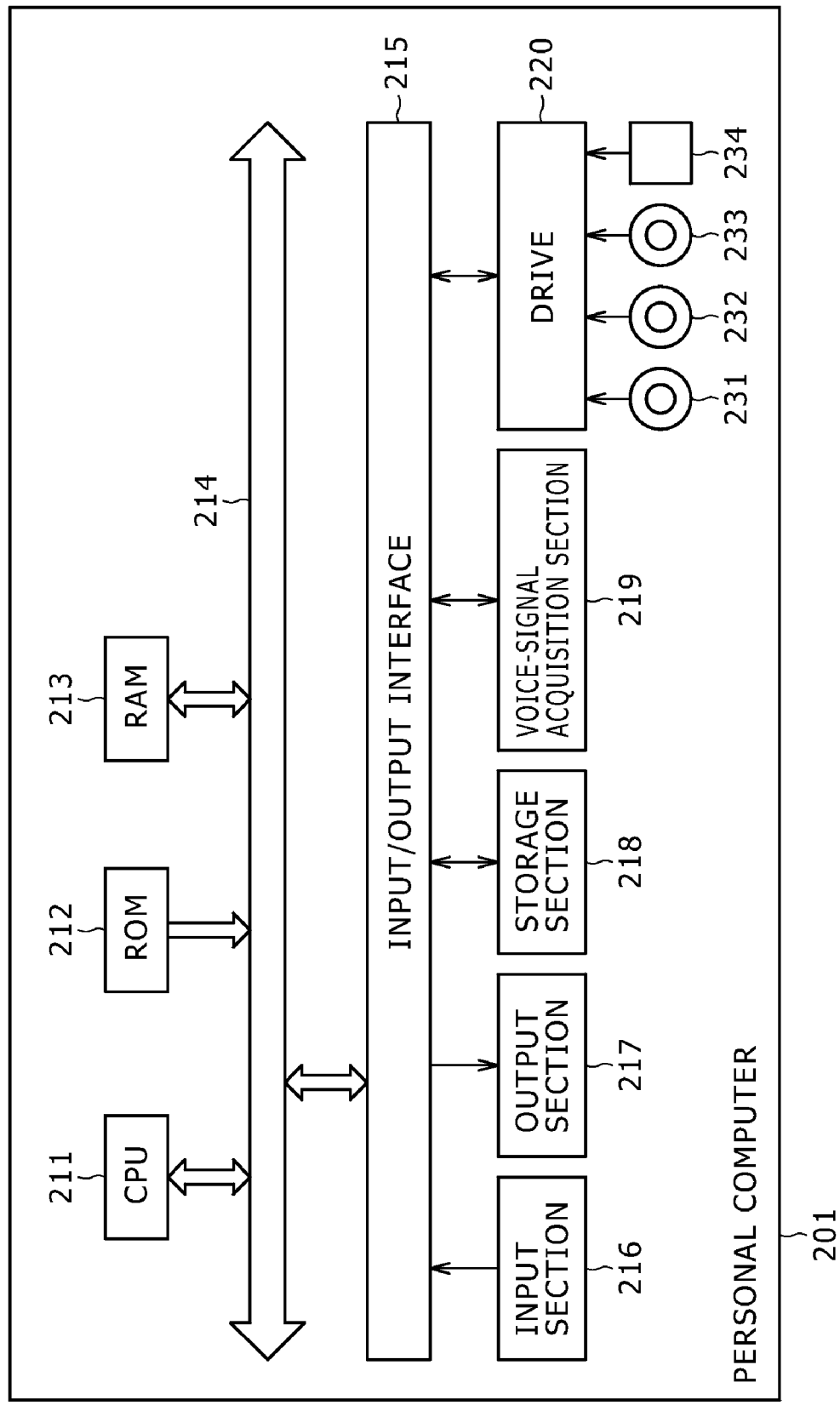

SPEECH RECOGNITION APPARATUS AND METHOD

CROSS REFERENCES TO RELATED APPLICATIONS

The present invention contains subject matter related to Japanese Patent Application JP 2006-325780 filed in the Japan Patent Office on Dec. 1, 2006, the entire contents of which being incorporated herein by reference.

BACKGROUND OF THE INVENTION

1. Field of the Invention

The present invention relates to a voice processing apparatus, a voice processing method and a voice processing program. More particularly, the present invention relates to an excellent voice processing apparatus capable of recognizing a voice on the basis of the prosody characteristic of the voice, a voice processing method adopted in the voice processing apparatus and a voice processing program implementing the voice processing method.

2. Description of the Related Art

In recent years, a voice recognition (i.e., speech recognition) technology is widely used. In the past the voice recognition technology is basically a technology for recognizing information on a phoneme. Referred to hereafter as phoneme information, the information on a phoneme is part of information included in a voice. In the present state of the art, it is difficult to say that the ordinary voice recognition technology aggressively makes use of information on a prosody. Referred to hereafter as prosody information, the information on a prosody is information included in a voice as information other than the phoneme information.

However, this does not mean that existing technologies making use of prosody information do not exist at all. For example, there is known a technology, which makes use of prosody information in order to more properly recognize a boundary between phrases, or the like. For details of such a technology, the reader is suggested to refer to Japanese Patent Laid-Open No. Hei 4-66999 (hereinafter referred to as Patent Document 1).

SUMMARY OF THE INVENTION

However, the existing technology disclosed in patent reference 1 makes use of information on prosodies as auxiliary information in order to improve the precision of the voice recognition technology. Thus, the existing technology disclosed in Patent Document 1 is not a technology that is capable of clearly recognizing more diversified information included in information on prosodies.

By the way, by making use of information on phonemes only, a voice made by a human being may be difficult to recognize in some cases. For example, in the case of the Japanese language, the word 'ung' expressing an agreeing intention and the word 'uung' expressing a disagreeing intention are words all but identical with each other as seen from the phoneme-information point of view. Thus, in such a case, by making use of phoneme information only, it is difficult to distinguish the agreeing and disagreeing intentions from each other. It is therefore necessary to carry out a voice recognition process also based on prosody information such as information on pattern of intonations and on phoneme duration.

A technique of detecting a pitch frequency (or a pitch period) is widely adopted in an intonation-related process carried out as a part of the voice-signal processing. However, the technique of detecting a pitch frequency has a problem that an error is generated with ease due to the effects of noises or the like. In addition, an error is also generated with ease in the application of the technique to detect a pitch frequency to a whispering voice and a voice with a low-pitch characteristic. Thus, in a situation where an error is generated with ease in the implementation of the technique of detecting a pitch frequency as described above or in a voice recognition process prone to a detection error, the voice recognition processing based on the prosody information can be processing difficult to carry out.

Addressing the problems described above, inventors of the present invention have innovated a voice recognition apparatus and a voice recognition method, which are capable of effectively detecting a pitch frequency and recognizing an input voice with a high degree of reliability on the basis of the prosody characteristic of the voice even in the case of big effects of noises or the like and the case of a whispering voice or a voice with a low-pitch characteristic.

In accordance with an embodiment of the present invention, there is provided a voice processing apparatus for recognizing an input voice on the basis of a prosody characteristic of the voice. The voice processing apparatus employs:

voice acquisition means for acquiring the input voice;

acoustic analysis means for finding a relative pitch change on the basis of a frequency-direction difference between a first frequency characteristic seen at each frame time of the input voice acquired by the voice acquisition means and a second frequency characteristic determined in advance; and prosody recognition means for carrying out a prosody recognition process on the basis of the relative pitch change found by the acoustic analysis means in order to produce a result of the prosody recognition process.

It is possible to provide the voice processing apparatus with a configuration in which the acoustic analysis means finds the relative pitch change on the basis of a shift of a ridge line, which is drawn in a cross-correlation matrix computed from the first and second frequency characteristics as a straight line connecting matrix elements corresponding to peaks of the first and second frequency characteristics, from a main diagonal line of the cross-correlation matrix.

It is possible to provide the voice processing apparatus with a configuration further having frequency-characteristic storage means for storing the second frequency characteristic.

It is possible to provide the voice processing apparatus with a configuration in which:

the frequency-characteristic storage means is used for storing a plurality of aforementioned second frequency characteristics; and the acoustic analysis means finds the relative pitch change on the basis of a proper second frequency characteristic selected among the second frequency characteristics stored in the frequency-characteristic storage means in accordance with the input voice acquired by the voice acquisition means.

It is possible to provide the voice processing apparatus with a configuration further having:

voice recognition means for carrying out a voice recognition process, which is based on a characteristic quantity obtained as a result of an acoustic analysis carried out on the input voice acquired by the voice acquisition means, in order to produce a result of the voice recognition process in which it is quite within the bounds of possibility that the result of the voice recognition process is incorrect if the result of the voice recognition process matches one of special words; special-word storage means for storing the special words; and result selection means for collating the result of the voice recognition process with the special words stored in the special-word storage means, wherein if the result of the voice recognition process matches one of the special words stored in the special-word storage means, the result selection means outputs a final recognition result obtained by integrating the result of the voice recognition process carried out by the voice recognition means with the result of the prosody recognition process carried out by the prosody recognition means, but if the result of the voice recognition process does not match any one of the special words stored in the special-word storage means, on the other hand, the result selection means outputs the result of the voice recognition process carried out by the voice recognition means as a final recognition result.

In accordance with another embodiment of the present invention, there is provided a voice processing method adopted by a voice processing apparatus for recognizing an input voice on the basis of a prosody characteristic of the voice. The voice processing method includes the steps of:

acquiring the input voice;

finding a relative pitch change on the basis of a frequency-direction difference between a first frequency characteristic seen at each frame time of the acquired input voice and a second frequency characteristic determined in advance; and carrying out a prosody recognition process on the basis of the found relative pitch change in order to produce a result of the prosody recognition process.

In accordance with a further embodiment of the present invention, there is provided a voice processing program to be executed by a computer in order to recognize an input voice on the basis of a prosody characteristic of the voice. The voice processing program implements a voice processing method including the steps of:

acquiring the input voice;

finding a relative pitch change on the basis of a frequency-direction difference between a first frequency characteristic seen at each frame time of the input voice acquired in a controlled manner and a second frequency characteristic determined in advance; and carrying out a prosody recognition process on the basis of the found relative pitch change in order to produce a result of the prosody recognition process.

In accordance with the embodiments of the present invention:

an input voice is acquired;

a relative pitch change is found on the basis of a frequency-direction difference between a first frequency characteristic seen at each frame time of the acquired input voice and a second frequency characteristic determined in advance; and a prosody recognition process is carried out on the basis of the found relative pitch change in order to produce a result of the prosody recognition process.

The voice processing apparatus can be a stand-alone apparatus or a block for carrying out voice recognition processing of a voice recognition apparatus.

As described above, in accordance with the embodiments of the present invention, it is possible to recognize an input voice on the basis of a prosody characteristic of the voice. In particular, a relative pitch change is found on the basis of a frequency-direction difference between a first frequency characteristic seen at each frame time of the acquired input voice and a second frequency characteristic determined in advance. Thus, it is possible to recognize an input voice correctly even if the input voice includes an unvoiced sound portion or a silence segment.

BRIEF DESCRIPTION OF THE DRAWINGS

FIG. 2 is a block diagram showing the configuration of a prosody recognition section employed in the voice recognition apparatus shown in FIG. 1;

FIG. 10 is a diagram showing a cross-correlation matrix output by the relative pitch change computation section as a typical cross-correlation matrix of frequency characteristics;

FIG. 12 is a diagram showing a typical self-correlation matrix of a frequency characteristic;

FIG. 20A is a diagram showing the waveform of a normal voice output by the male to say the word 'ung' expressing an affirmation reply;

FIG. 20B is a diagram showing the real pitch pattern of the normal voice output by the male to say the word 'ung' expressing an affirmation reply;

FIG. 20C is a diagram showing the relative pitch pattern of the normal voice output by the male to say the word 'ung' expressing an affirmation reply;

FIG. 22A is a diagram showing the waveform of a normal voice output by the male to say the word 'ung?' expressing a doubt reply;

FIG. 22B is a diagram showing the real pitch pattern of the normal voice output by the male to say the word 'ung?' expressing a doubt reply;

FIG. 22C is a diagram showing the relative pitch pattern of the normal voice output by the male to say the word 'ung?' expressing a doubt reply;

FIG. 28 is a diagram showing a graphical expression of a correct cross-correlation matrix obtained from two frequency characteristics on two frames before and after a portion included in the word 'utsumuku' as a portion other than a unvoiced sound portion;

FIG. 29 is a diagram showing a graphical expression of an incorrect cross-correlation matrix obtained from a frequency characteristic on a frame before a unvoiced sound portion corresponding to the character 'k' of the word 'utsumuku' and a frequency characteristic on a frame after the unvoiced sound portion;

FIG. 33 shows a flowchart to be referred to in description of second relative pitch difference computation processing carried out by the relative pitch change computation section shown in FIG. 30; and FIG. 34 is a block diagram showing the configuration of a personal computer functioning as the voice recognition apparatus.

DETAILED DESCRIPTION OF THE PREFERRED EMBODIMENTS

Before preferred embodiments of the present invention are explained, relations between disclosed inventions and the embodiments are explained in the following comparative description. It is to be noted that, even if there is an embodiment described in this specification but not included in the following comparative description as an embodiment corresponding to an invention, such an embodiment is not to be interpreted as an embodiment not corresponding to an invention. Conversely speaking, an embodiment included in the following comparative description as an embodiment corresponding to a special invention is not to be interpreted as an embodiment not corresponding to an invention other than the special invention.

In addition, the following comparative description is not to be interpreted as a comprehensive description covering all inventions disclosed in this specification. In other words, the following comparative description by no means denies existence of inventions disclosed in this specification but not included in claims as inventions for which a patent application is filed. That is to say, the following comparative description by no means denies existence of inventions to be included in a separate application for a patent, included in an amendment to this specification or added in the future.

Figure 30:
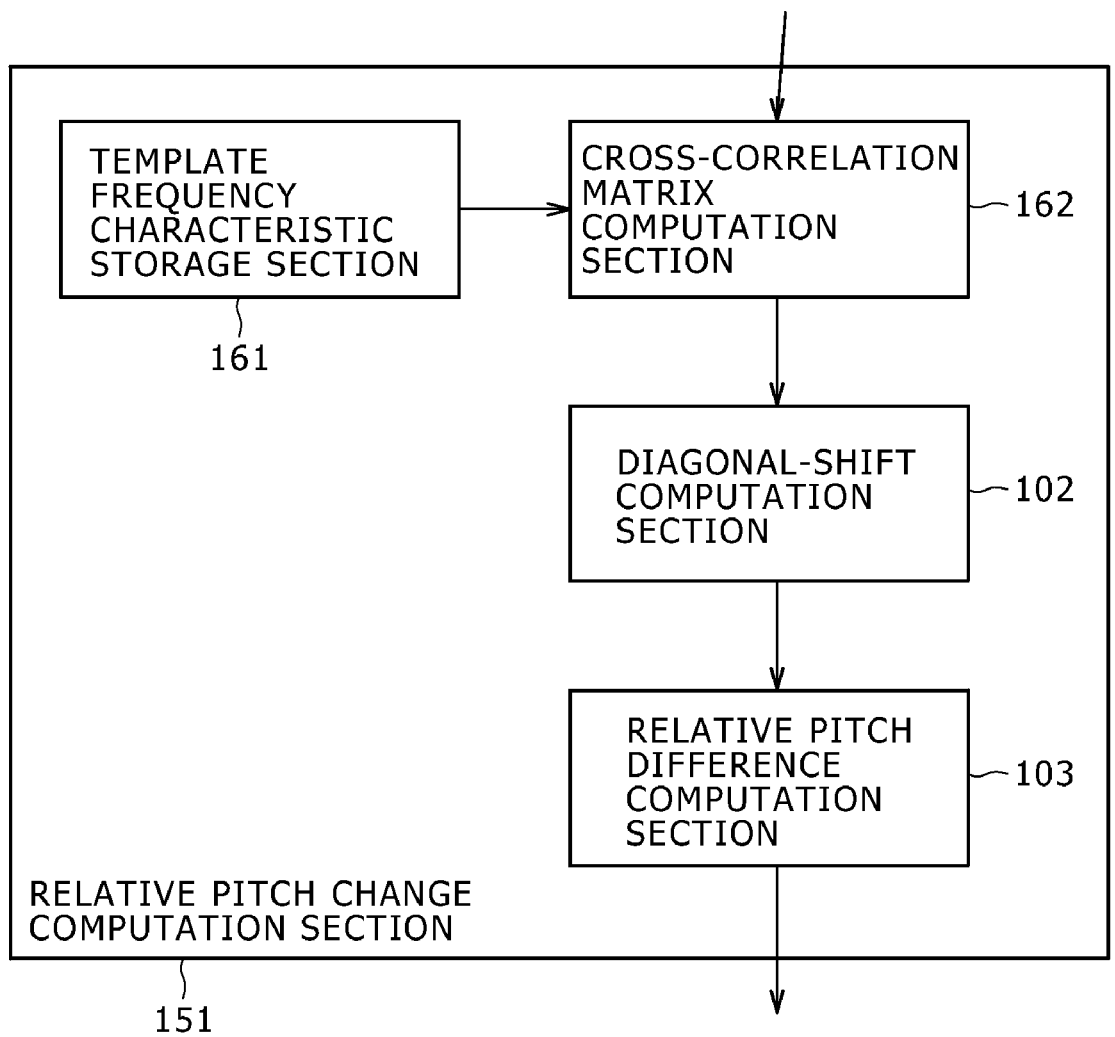
FIG. 30 is a block diagram showing a second typical functional configuration of the relative pitch change computation section employed in the prosody recognition section shown in FIG. 2.

In accordance with an embodiment of the present invention, there is provided a voice processing apparatus (such as an apparatus including a prosody recognition section 32 shown in FIG. 2 as a section employing a relative pitch change computation section 151 shown in FIG. 30) for recognizing an input voice on the basis of a prosody characteristic of the voice. The voice processing apparatus employs:

voice acquisition means (such as a word input section 51 shown in FIG. 2) for acquiring the input voice;

acoustic analysis means (such as an acoustic-analysis section 52 of FIG. 2 as a section including the relative pitch change computation section 151 shown in FIG. 30) for finding a relative pitch change on the basis of a frequency-direction difference between a first frequency characteristic seen at each frame time of the input voice acquired by the voice acquisition means and a second frequency characteristic determined in advance; and prosody recognition means (such as a prosody recognition subsection 53 shown in FIG. 2) for carrying out a prosody recognition process on the basis of the relative pitch change found by the acoustic analysis means in order to produce a result of the prosody recognition process.

It is possible to provide the voice processing apparatus with a configuration further having frequency-characteristic storage means (such as a template frequency characteristic storage section 161 shown in FIG. 30) for storing the second frequency characteristic.

It is possible to provide the voice processing apparatus with a configuration further having:

voice recognition means (such as a voice recognition section 33 shown in FIG. 1) for carrying out a voice recognition process, which is based on a characteristic quantity obtained as a result of an acoustic analysis carried out on the input voice acquired by the voice acquisition means, in order to produce a result of the voice recognition process in which it is quite within the bounds of possibility that the result of the voice recognition process is incorrect if the result of the voice recognition process matches one of special words;

special-word storage means (such as a special-word storage section 35 shown in FIG. 1) for storing the special words; and result selection means (such as a result selection section 34 shown in FIG. 1) for collating the result of the voice recognition process with the special words stored in the special-word storage means, wherein if the result of the voice recognition process matches one of the special words stored in the special-word storage means, the result selection means outputs a final recognition result obtained by integrating the result of the voice recognition process carried out by the voice recognition means with the result of the prosody recognition process carried out by the prosody recognition means, but if the result of the voice recognition process does not match any one of the special words stored in the special-word storage means, on the other hand, the result selection means outputs the result of the voice recognition process carried out by the voice recognition means as a final recognition result.

Figure 14:
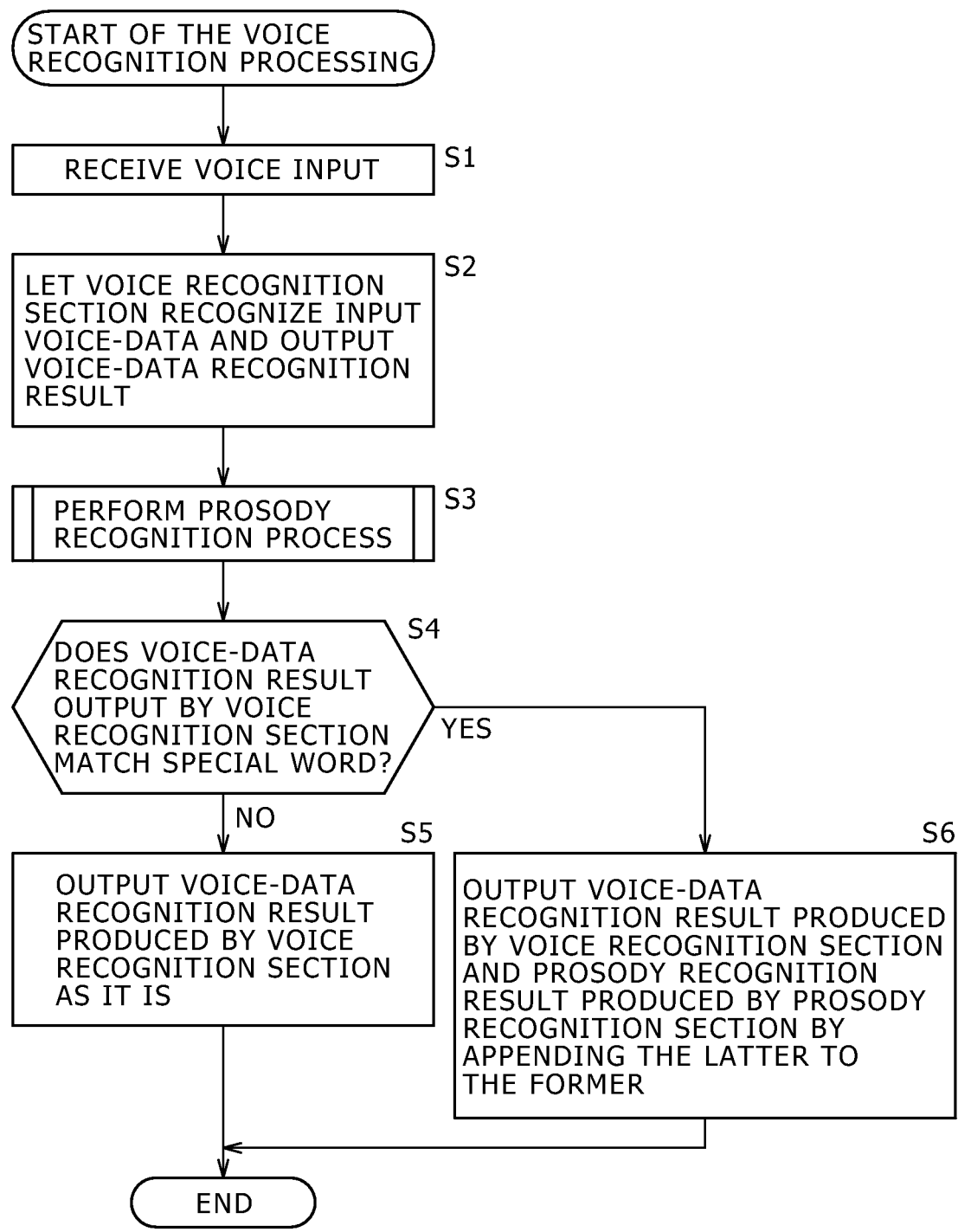
FIG. 14 shows a flowchart to be referred to in description of processing carried out by the voice recognition apparatus in order to recognize a phoneme of a voice and a prosody of the voice.

In accordance with another embodiment of the present invention, there is provided a voice processing method adopted by a voice processing apparatus (such as an apparatus including the prosody recognition section 32 shown in FIG. 2 as a section employing the relative pitch change computation section 151 shown in FIG. 30) for recognizing an input voice on the basis of a prosody characteristic of the voice. The voice processing method includes the steps of:

acquiring the input voice (for example, in a process carried out at a step S1 of a flowchart shown in FIG. 14);

finding a relative pitch change on the basis of a frequency-direction difference between a first frequency characteristic seen at each frame time of the acquired input voice and a second frequency characteristic determined in advance (for example, in a process carried out at a step S121 of a flowchart shown in FIG. 33); and carrying out a prosody recognition process on the basis of the found relative pitch change in order to produce a result of the prosody recognition process (for example, in processes carried out at steps S4 to S6 of the flowchart shown in FIG. 14).

In accordance with a further embodiment of the present invention, there is provided a voice processing program to be executed by a computer in order to recognize an input voice on the basis of a prosody characteristic of the voice. The voice processing program implements a voice processing method including the steps of:

acquiring the input voice (for example, in the process carried out at the step S1 of the flowchart shown in FIG. 14);

finding a relative pitch change on the basis of a frequency-direction difference between a first frequency characteristic seen at each frame time of the input voice acquired in a controlled manner and a second frequency characteristic determined in advance (for example, in the process carried out at the step S121 of the flowchart shown in FIG. 33); and carrying out a prosody recognition process on the basis of the found relative pitch change in order to produce a result of the prosody recognition process (for example, in the processes carried out at the steps S4 to S6 of the flowchart shown in FIG. 14).

Next, the preferred embodiments of the present invention are described in detail by referring to diagrams as follows.

Figure 1:
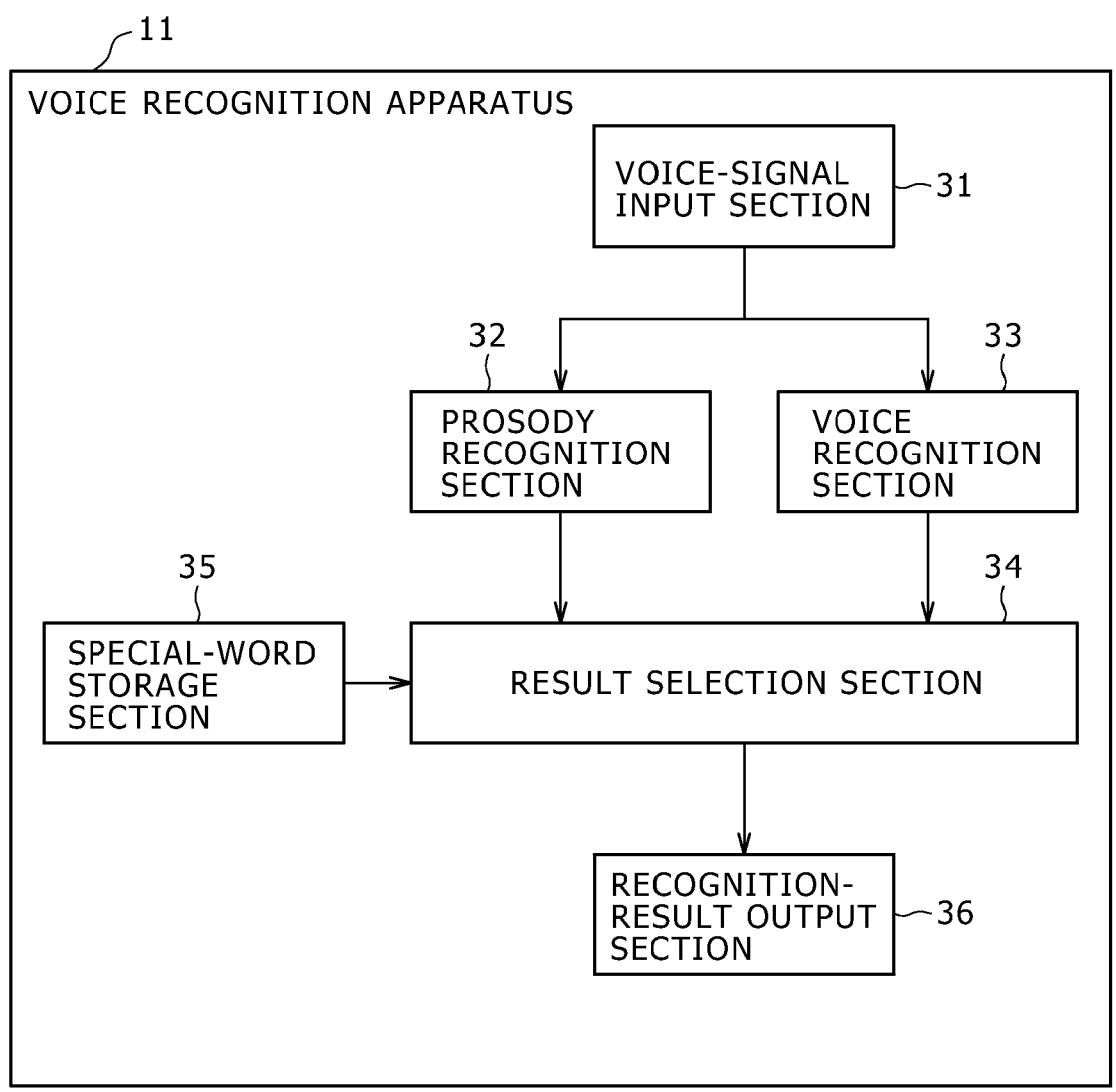
FIG. 1 is a block diagram showing the configuration of a voice recognition apparatus to which the present invention is applied.

FIG. 1 is a block diagram showing the configuration of a voice recognition apparatus 11 to which the present invention is applied.

As shown in the figure, the voice recognition apparatus 11 employs a voice-signal input section 31, a prosody recognition section 32, a voice recognition section 33, a result selection section 34, a special-word storage section 35 and a recognition-result output section 36.

The voice-signal input section 31 is a unit for receiving a voice signal from a microphone or the like or a voice signal from another apparatus.

The prosody recognition section 32 is a unit for carrying out a prosody recognition process in order to recognize an input voice. The prosody is voice information that may not be expressed in a written text. Examples of the prosody are intonations, speed changes and volume changes. Details of the prosody recognition process carried out by the prosody recognition section 32 will be described later.

The voice recognition section 33 is a unit for carrying out a voice recognition process in order to recognize an input voice. In this case, the voice recognition section 33 may carry out a voice recognition process that is commonly known.

If the result of the voice recognition process carried out by the voice recognition section 33 matches a special word already stored in the special-word storage section 35, the result selection section 34 appends the result of the prosody recognition process carried out by the prosody recognition section 32 to the result of the voice recognition process carried out by the voice recognition section 33 and outputs the result of the voice recognition process carried out by the voice recognition section 33 to the recognition-result output section 36 along with the appended result of the prosody recognition process carried out by the prosody recognition section 32. If the result of the voice recognition process carried out by the voice recognition section 33 does not match any of special words already stored in the special-word storage section 35, on the other hand, the result selection section 34 outputs the result of the voice recognition process carried out by the voice recognition section 33 to the recognition-result output section 36 as it is.

The special-word storage section 35 is a memory used for recording special words to be collated with a result of the voice recognition process carried out by the voice recognition section 33. To put it concretely, the special-word storage section 35 is used for storing special words with which a result of the voice recognition process carried out by the voice recognition section 33 on an input word is to be collated. An input word is also subjected to a prosody recognition process carried out by the prosody recognition section 32. An example of the special word stored in the special-word storage section 35 is the word 'ung.'

The recognition-result output section 36 is a unit for outputting a recognition result received from the result selection section 34 as a result of the voice recognition process carried out by the voice recognition section 33 and, if necessary, a result of the prosody recognition process carried out by the prosody recognition section 32 to an external result receiving apparatus. That is to say, the recognition-result output section 36 displays the recognition result on a screen or outputs the result as a sound. In addition, the recognition-result output section 36 gives a command to another external apparatus in order to move the external apparatus by making use the recognition result.

Next, operations carried out by the voice recognition apparatus 11 are explained.

In the configuration shown in FIG. 1, a voice entered through the voice-signal input section 31 is supplied to the prosody recognition section 32 and the voice recognition section 33. The prosody recognition section 32 and the voice recognition section 33 carry out prosody and voice recognition processes respectively on the data of the input voice. As a result of the prosody recognition process, the prosody recognition section 32 outputs an utterance type (or an utterance intention of the user) identified on the basis of a prosody pattern of the input-voice data to the result selection section 34. On the other hand, as a result of the voice recognition process, the voice recognition section 33 outputs text information for the data of the input voice to the result selection section 34.

The result selection section 34 collates the result of the voice recognition process with special words stored in the special-word storage section 35 and, if the result of the voice recognition process matches one of the special words, the result of the prosody recognition process is appended to (or integrated with) the result of the voice recognition process. Then, the result selection section 34 outputs the result of the prosody recognition process and the result of the voice recognition process to an external recipient by way of the recognition-result output section 36. If the result of the voice recognition process does not match any one of the special words, on the other hand, the result selection section 34 outputs the result of the voice recognition process to the external recipient by way of the recognition-result output section 36 as it is.

An example of the special words is the word 'ung.' Let us assume that the result of the voice recognition process carried out by the voice recognition section 33 matches the word 'ung.' As described before, the prosody recognition section 32 carries out a prosody recognition process in order to determine one of three utterance types (or utterance intention of the uttering speaker) for the input word 'ung.' That is to say, the prosody recognition section 32 determines whether the input word 'ung' is the word 'ung' expressing an affirmation, a denial or a doubt. Since the result of the voice recognition process carried out by the voice recognition section 33 matches the word 'ung,' the result selection section 34 appends the affirmation, denial or doubt utterance type determined by the prosody recognition section 32 to the result of the voice recognition process.

For example, it is also possible to provide a configuration in which the prosody recognition section 32 carries out a prosody recognition process in order to determine one of four utterance types for each input word. The fourth utterance type is referred to as another utterance type other than the affirmation, denial and doubt utterance types. If the prosody recognition section 32 outputs the other utterance type to the result selection section 34, the result selection section 34 supplies only a result received from the voice recognition section 33 as the result of the final recognition process to the recognition-result output section 36. If the prosody recognition section 32 outputs one of the affirmation, denial and doubt utterance types to the result selection section 34, on the other hand, the result selection section 34 appends the utterance type received from the prosody recognition section 32 to the result received from the voice recognition section 33 as the result of the voice recognition process and supplies the result of the voice recognition process along with the appended utterance type to the recognition-result output section 36. Thus, the special-word storage section 35 can be eliminated from this configuration.

FIG. 2 is a block diagram showing the configuration of the prosody recognition section 32 employed in the voice recognition apparatus 11 shown in FIG. 1.

As shown in FIG. 2, the prosody recognition section 32 has a word input section 51, an acoustic-analysis section 52, a prosody recognition subsection 53, a parameter storage section 54 and a prosody output section 55.

The word input section 51 includes a unit for receiving a voice signal, which receives the signal from a microphone or the like, an amplifier for amplifying the signal and an AD converter for converting the amplified signal into a digital signal. The word input section 51 samples the input voice signal at a typical frequency of 16 kHz and supplies the output digital signal to the acoustic-analysis section 52.

The acoustic-analysis section 52 employs a frequency-characteristic analysis section 61 and a relative pitch change computation section 62. The acoustic-analysis section 52 extracts a characteristic quantity (or a relative pitch change to be described later) requisite for the prosody recognition process from an input voice signal and supplies the characteristic quantity to the prosody recognition subsection 53. The internal process of the acoustic-analysis section 52 will be described later.

The prosody recognition subsection 53 is a unit for carrying out a prosody recognition process on unknown voice data by collating a characteristic quantity as a quantity representing the unknown voice data with parameters stored in the parameter storage section 54. The parameters have been created in advance on the basis of characteristic quantities obtained by carrying out an acoustic analysis on voice data prepared for a learning process.

The prosody recognition process carried out by the prosody recognition subsection 53 on unknown voice data is a process to select a prosody recognition unit corresponding to an input voice signal representing the unknown voice data from a prosody recognition unit dictionary. Main prosody recognition techniques adopted in the prosody recognition process include a DP (Dynamic Programming) matching technique, a neural network technique and an HMM (Hidden Markoff Model) technique.

In accordance with the DP matching technique, first of all, standard patterns each referred to as a template are each found in advance as a parameter from characteristic quantities obtained by analyzing voice signals. Then, a characteristic quantity of an unknown voice is collated with the parameters in order to find a parameter determined to be the one closest to the characteristic quantity. In addition, in order to absorb variations in utterance speed, a method is used for contracting the time axis in accordance with a dynamic time warping technique so as to minimize distortions with respect to a template.

A prosody recognition process according to the neural network technique is a prosody recognition process carried out by making use of a network model imitating the structure of the brain of a human being. First of all, a weight coefficient of a path is determined in advance as a parameter by carrying out a learning process. Then, the distances between an output obtained by entering a characteristic quantity of an unknown voice to the network model and prosody recognition units listed in a prosody recognition unit dictionary are found in order to determine a prosody recognition unit corresponding to the input unknown voice.

In accordance with the HMM technique, the prosody recognition process is carried out by making use of a probability model. First of all, for a state-transition model, transition probabilities and output symbol probabilities are determined in advance on the basis of learning data. Then, a prosody recognition unit is determined from model occurrence probabilities for the characteristic quantity of an unknown voice.

As described above, the prosody recognition processing carried out by the prosody recognition subsection 53 generally includes a learning process and a prosody recognition process. In the learning process, parameters determined from data prepared for a learning process are found and stored in the parameter storage section 54 in advance. Examples of the parameters determined from data prepared for a learning process are templates, weight coefficients of a network model and statistical parameters of a probability model. Then, in the prosody recognition process, after an input unknown voice signal is subjected to an acoustic analysis, a process to give a score to each prosody recognition unit listed in a prosody recognition unit dictionary in order to select a prosody recognition unit having the highest score among those listed in the dictionary or a plurality of prosody recognition units each having a relatively high score in comparison with those listed in the dictionary as a result of the prosody recognition process. In accordance with the prosody recognition technique adopted in the prosody recognition process, the score may represent a distance according to the neural network technique, the occurrence probability according to the HMM technique or another quantity.

For example, in the case of the special word 'ung,' the prosody recognition subsection 53 carries out a prosody recognition process for three types of utterance in order to determine whether the special word is the word 'ung' expressing an affirmation, the word 'uung' expressing a denial or the word 'ung?' expressing a doubt and supplies the result of the prosody recognition process to the prosody output section 55.

The prosody output section 55 passes on the result of the prosody recognition process to the result selection section 34.

Figure 3:
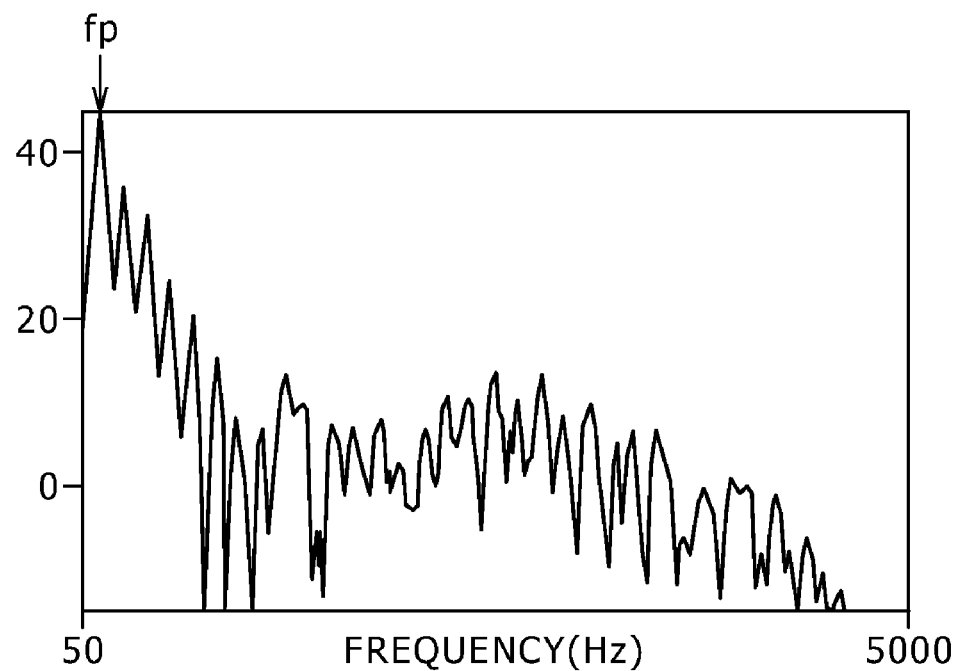
FIG. 3 is a diagram showing a frequency characteristic of a normal voice.

By the way, in an existing process of detecting a pitch frequency, as a presumption, the length of a pitch period, which is the period of a vocal-cord vibration in a voice, is uniquely determined. As an alternative, the pitch period, which is the reciprocal of the pitch period, is uniquely determined. A process carried out in order to uniquely determine a pitch period is a process of finding the center frequency of a peak component existing in the lowest frequency region in the distribution of a frequency characteristic for an uttered word. For example, in the case of a frequency characteristic like one shown in FIG. 3 as a frequency characteristic of a normal voice, a frequency fp is a pitch frequency.

If noises are mixed with an uttered word, however, in the case of an uttered voice with a low-pitch characteristic as is the case with a whispering voice, the existing process of determining a pitch frequency as described above is difficult to carry out. In the case of a frequency characteristic like one shown in FIG. 4 as the frequency characteristic of a whispering voice, it is difficult to detect the center frequency of a peak component existing in the lowest frequency region in the distribution of the frequency characteristic. This difficulty of detection can be said to be a difficulty attributed to the fact that the process carried out in order to detect a peak frequency is a process depending on the peak property of the frequency characteristic.

Figure 4:
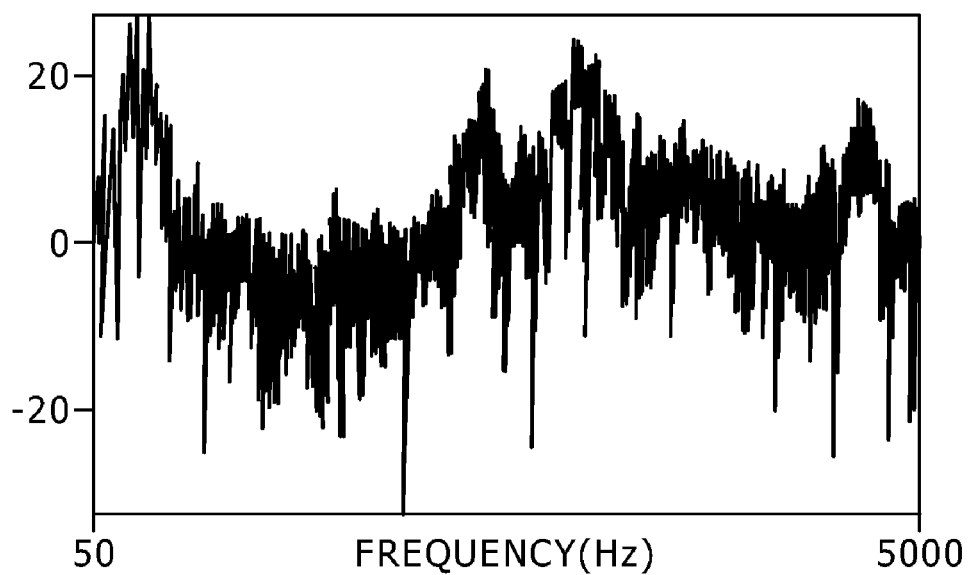
FIG. 4 is a diagram showing a frequency characteristic of a whispering voice.

On the other hand, even if it is difficult to detect the pitch frequency of a whispering voice having a frequency characteristic like the one shown in FIG. 4, the prosody recognition section 32 utilizes a relative pitch change so as to make it possible to avoid a process carried out to uniquely determine a proper pitch frequency as a process depending on the peak property of the frequency characteristic. Thus, a change in intonation can be grasped more robustly.

In addition, in the existing pitch-frequency detection processing, the frequency characteristic of an uttered voice is handled as one characteristic quantity distribution and a desired characteristic (or a pitch frequency) is extracted from the distribution. Since the prosody recognition section 32 directly finds a change in pitch frequency without determining the pitch frequency, however, a process carried out in order to normalize a pitch frequency and a pitch variation range is not demanded. The pitch variation range is a range of variations in pitch frequency. In addition, the prosody recognition section 32 is capable of more properly grasping changes in intonation in an uttered voice.

Such a process is implemented as processing carried out mainly by the acoustic-analysis section 52.

Figure 5:
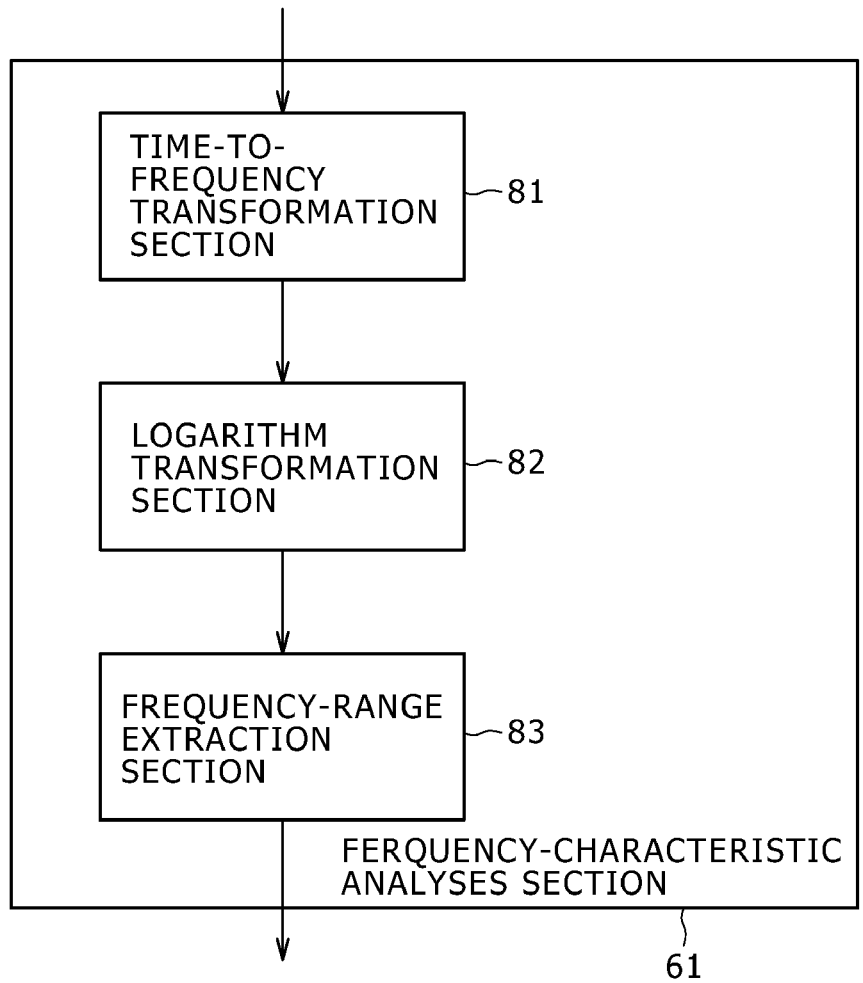
FIG. 5 is a block diagram showing the functional configuration of a frequency-characteristic analysis section.

FIG. 5 is a block diagram showing the functional configuration of the frequency-characteristic analysis section 61. As shown in the figure, the frequency-characteristic analysis section 61 includes a time-to-frequency transformation section 81, a logarithm transformation section 82 and a frequency-range extraction section 83. The function of each of the time-to-frequency transformation section 81, the logarithm transformation section 82 and the frequency-range extraction section 83 can be implemented by hardware or execution of software.

Figure 6:
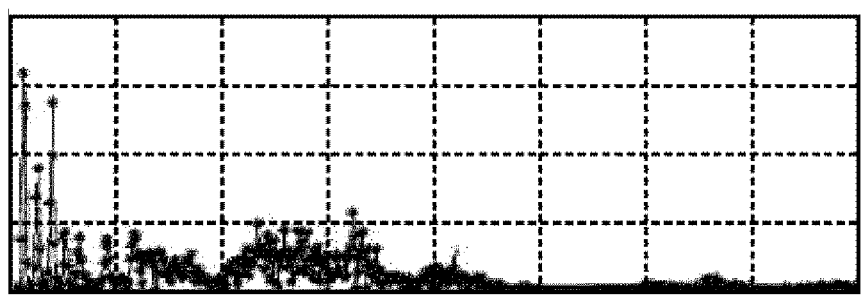
FIG. 6 is a diagram showing a typical frequency characteristic output by a time-to-frequency transformation section employed in the frequency-characteristic analysis section shown in FIG. 5 as a time-to-frequency transformation section according to an embodiment of the present invention.

The time-to-frequency transformation section 81 is a unit for carrying out a time-frequency conversion process such as an FFT analysis in order to transform an input voice signal from a signal varying in the time domain into a signal varying in the frequency domain. The signal varying in the frequency domain shows a general frequency characteristic, which is then supplied to the logarithm transformation section 82. FIG. 6 is a diagram showing a typical frequency characteristic output by the time-to-frequency transformation section 81.

Figure 7:
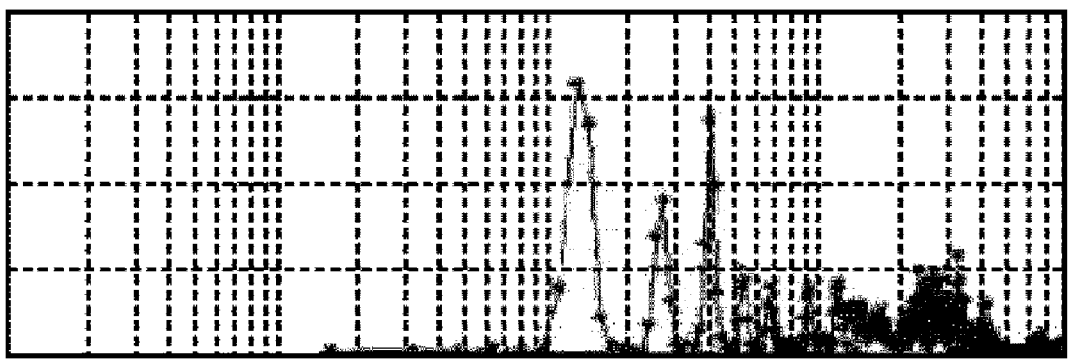
FIG. 7 is a diagram showing a typical frequency characteristic output by a logarithm transformation section employed in the frequency-characteristic analysis section shown in FIG. 5 as a logarithm transformation section according to an embodiment of the present invention.

The logarithm transformation section 82 is a unit for transforming the frequency axis of the general frequency characteristic received from the time-to-frequency transformation section 81 into an axis having a logarithmic scale in order to transform the general frequency characteristic into a frequency characteristic over a logarithmic frequency axis. The logarithm transformation section 82 then supplies the frequency characteristic over a logarithmic frequency axis to the frequency-range extraction section 83. FIG. 7 is a diagram showing a typical frequency characteristic output by the logarithm transformation section 82.

Figure 8:
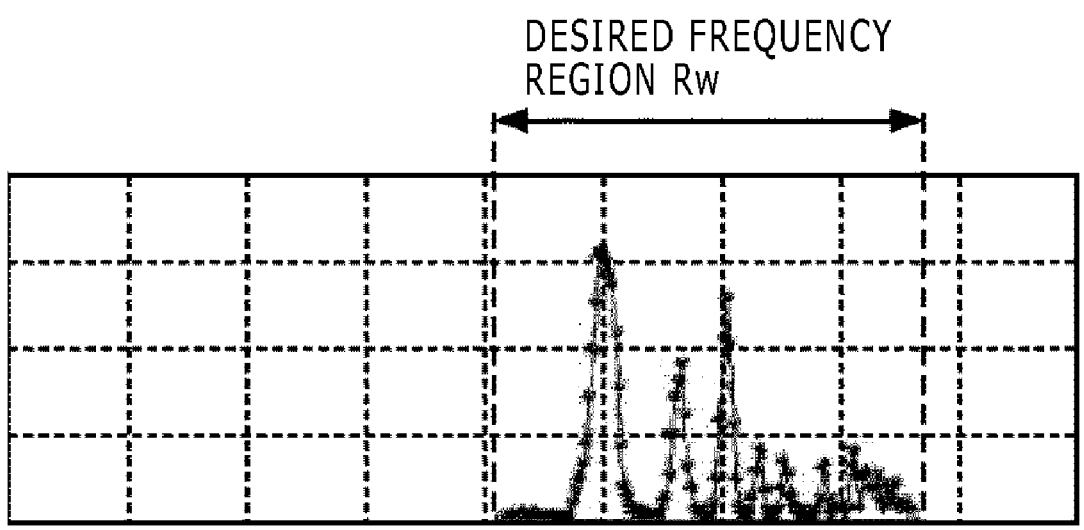
FIG. 8 is a diagram showing a typical frequency characteristic output by a frequency-range extraction section employed in the frequency-characteristic analysis section shown in FIG. 5 as a frequency-range extraction section according to an embodiment of the present invention.

The frequency-range extraction section 83 is a unit for extracting only a desired frequency region portion Rw from the frequency characteristic received from the logarithm transformation section 82 as the frequency characteristic over a logarithmic frequency axis and outputting the extracted frequency region portion as a result of the frequency-characteristic analysis. FIG. 8 is a diagram showing the portion Rw of a typical frequency characteristic extracted from the frequency characteristic shown in FIG. 7 as a frequency characteristic over a logarithmic frequency axis.

The frequency-characteristic analysis section 61 supplies the frequency characteristic like the one shown in FIG. 8 to the relative pitch change computation section 62 as the result of the frequency-characteristic analysis.

Figure 9:
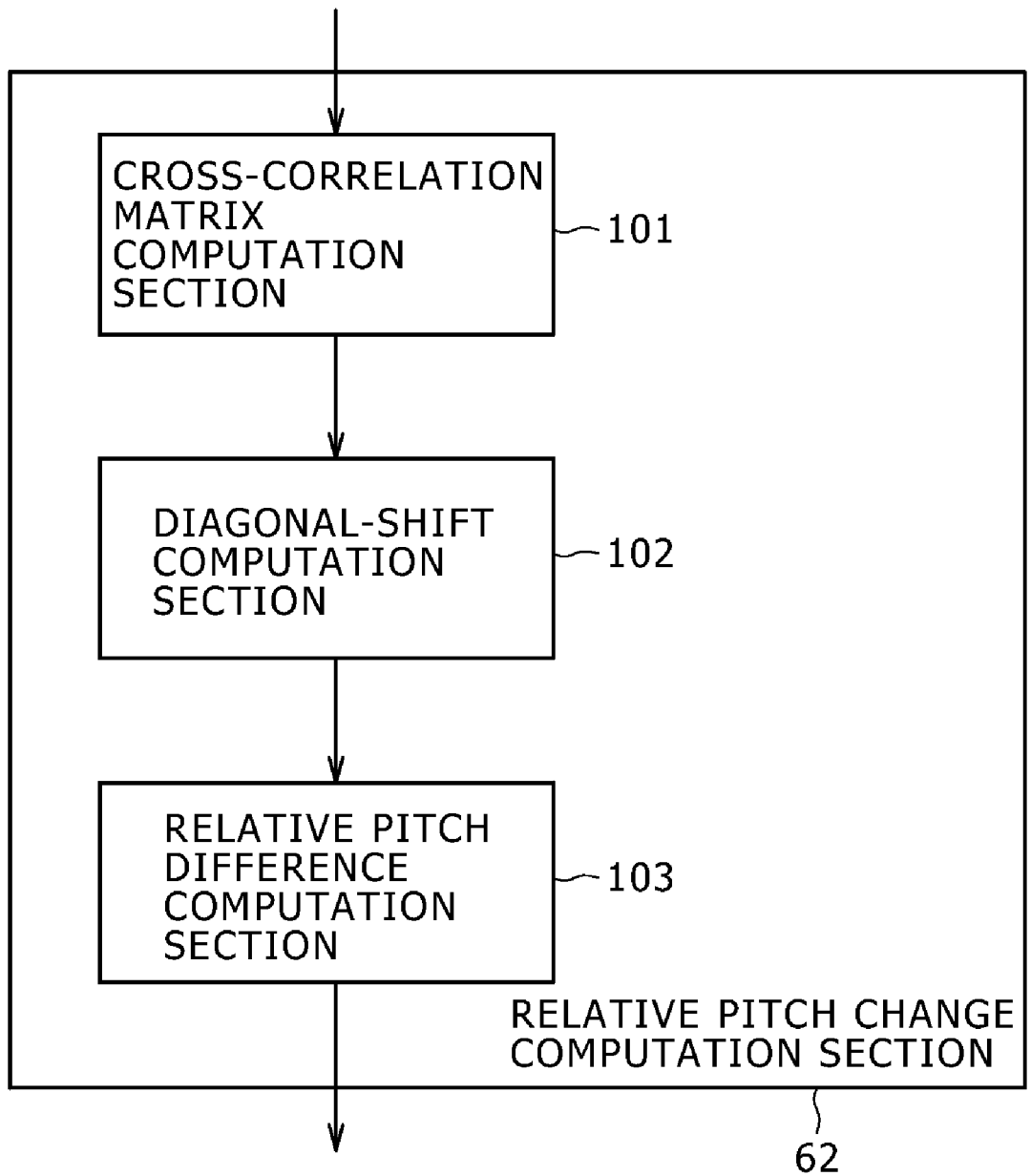
FIG. 9 is a block diagram showing a first typical functional configuration of a relative pitch change computation section employed in the prosody recognition section shown in FIG. 2.

FIG. 9 is a block diagram showing the functional configuration of the relative pitch change computation section 62. As shown in the figure, the relative pitch change computation section 62 includes a cross-correlation matrix computation section 101, a diagonal-shift computation section 102 and a relative pitch difference computation section 103. The function of each of the cross-correlation matrix computation section 101, the diagonal-shift computation section 102 and the relative pitch difference computation section 103 can be implemented by hardware or execution of software.

The cross-correlation matrix computation section 101 is a unit for computing a cross-correlation matrix M between frequency characteristics by making use of two frequency characteristics received from the frequency-range extraction section 83 employed in the frequency-characteristic analysis section 61 as two frequency characteristics of respectively two different analyzed frames selected among analyzed frames.

Let column vectors X and Y represent respectively the two frequency characteristics received from the frequency-range extraction section 83 employed in the frequency-characteristic analysis section 61 as two frequency characteristics of two different analyzed frames respectively and let notation N denote the order of the column vectors X and Y. The column vectors X and Y are expressed respectively by Eqs. (1) and (2) given below. In this case, as expressed by Eq. (3) given below, the cross-correlation matrix M is a matrix obtained as a product resulting from multiplying the column vector X by a vector Y', which is the transposed matrix of the column vector Y.

$$X=(x_1, x_2, \ldots, x_N)^T \quad (1)$$

$$Y=(y_1, y_2, \ldots, y_N)^T \quad (2)$$

$$M=X*Y^T \quad (3)$$

Figure 11:
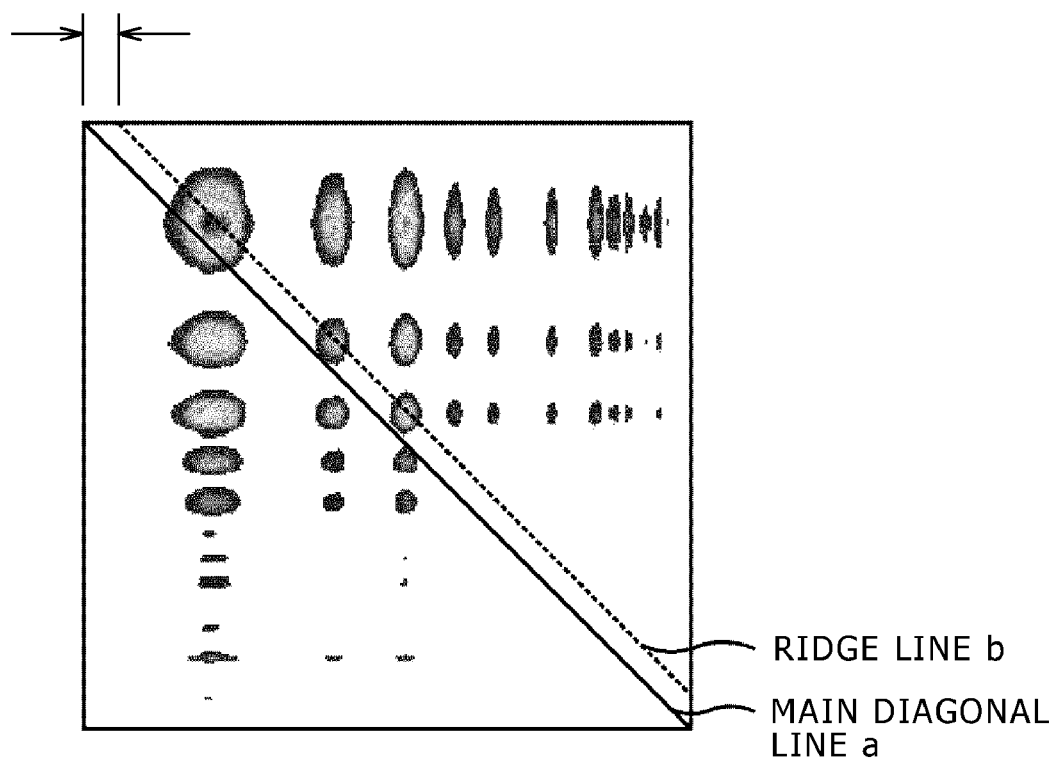
FIG. 11 is a diagram showing a graphical expression of elements composing the cross-correlation matrix shown in FIG. 10.

FIG. 10 is a diagram showing the cross-correlation matrix M expressed by Eq. (3). FIG. 11 is a diagram showing a graphical representation expressing the numerical values of the elements composing the cross-correlation matrix M as concentrations (or degrees of brightness and darkness).

It is to be noted that, for the purpose of comparison, let us assume that the two frequency characteristics are identical with each other. In this case, the cross-correlation matrix M is referred to as a self-correlation matrix M for the two frequency characteristics, which are the same frequency characteristic represented by the column vector X. FIG. 12 is a diagram showing the self-correlation matrix M whereas FIG. 13 is a diagram showing a graphical representation expressing the numerical values of the elements composing the self-correlation matrix M as concentrations.

Figure 13:
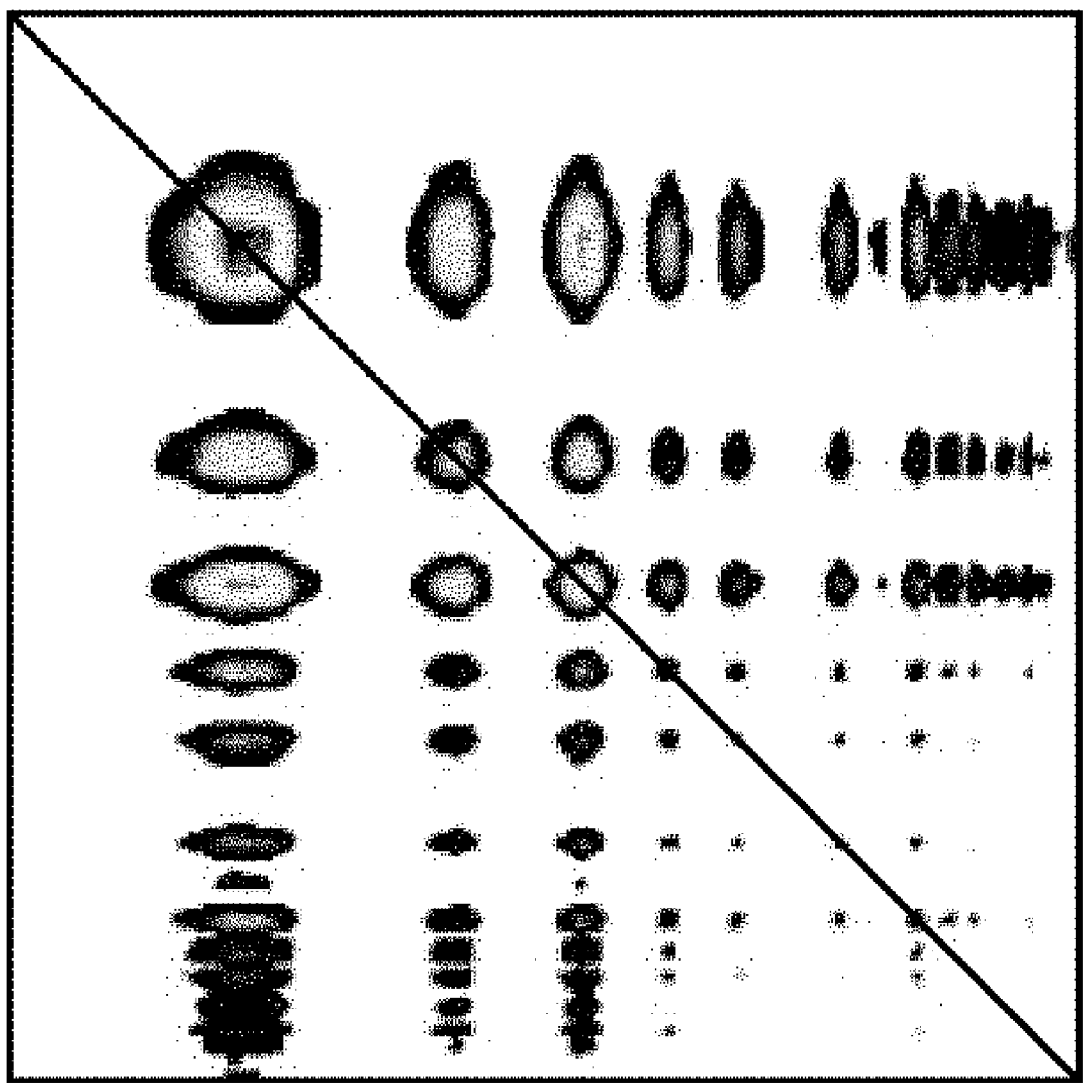
FIG. 13 is a diagram showing a graphical expression of elements composing the self-correlation matrix shown in FIG. 12.

As is obvious from FIGS. 12 and 13, the self-correlation matrix M obtained from only one frequency characteristic is a symmetrical matrix. The main diagonal line a of the self-correlation matrix M is a vector (or a power spectrum) consisting of the squares of amplitudes observed in the frequency characteristic. That is to say, the main diagonal line a of the self-correlation matrix M is a straight line connecting the squares of amplitudes (or peaks) observed in the frequency characteristic. On the other hand, elements included in the self-correlation matrix M as elements other the elements connected by the main diagonal line a are not the squares of amplitudes (or peaks) observed in the frequency characteristic.

By the way, a ridge line b of the cross-correlation matrix M shown in FIG. 11 is parallel to the main diagonal line a.

As shown in FIG. 11, in the cross-correlation matrix M obtained from two different frequency characteristics, the ridge line b is shifted from the main diagonal line a. This is because the pitch frequency in one of the frequency characteristics is different from the pitch frequency in the other frequency characteristic. The frequency position of every peak component in each of the frequency characteristics is a position corresponding to approximately a multiple of the pitch frequency. In the case of two frequency characteristics for respectively two frames analyzed at different times, the pitch frequency of one of the frames is different from the pitch frequency of the other frame. Thus, in the cross-correlation matrix M obtained from the two frequency characteristics (characteristics expressed over a logarithmic frequency axis) with pitch frequency different from each other, the ridge line b connecting matrix elements laid out in a direction parallel to the main diagonal line a in the cross-correlation matrix M as elements each representing the product of peaks observed in the frequency characteristics is thus a line parallel to the main diagonal line a. That is to say, the ridge line b is shifted from the main diagonal line a by a shift distance c corresponding to a difference appearing on the logarithmic time as a difference in shift frequency between the two frequency characteristics.

The diagonal-shift computation section 102 is a unit for finding a distance c shown in FIG. 11 as a shift distance between the ridge line b and the main diagonal line a in the cross-correlation matrix M obtained from two different frequency characteristics for respectively two frames analyzed at different times and supplying the shift distance c to the relative pitch difference computation section 103.

The relative pitch difference computation section 103 is a unit for computing a difference in pitch frequency between analyzed frames on the basis of a displacement distance c received from the diagonal-shift computation section 102 as a shift distance between the ridge line b and the main diagonal line a in the cross-correlation matrix M without finding the pitch frequency of each of the analyzed frames. In the following description, the difference in pitch frequency between analyzed frames is referred to as a relative pitch difference.

As described above, a relative pitch difference between two frames analyzed at different times can be found from the two frequency characteristics of the two analyzed frames respectively. For example, a relative pitch difference between two time-wise adjacent analyzed frames can be found from the two frequency characteristics of the two time-wise adjacent analyzed frames respectively.

Then, the relative pitch difference computation section 103 cumulatively adds up relative pitch differences each computed from the two frequency characteristics of two time-wise adjacent analyzed frames for a desired number of analyzed frames in order to find a relative pitch change for the desired number of analyzed frames. In a typical method for determining a desired number of analyzed frames, a recognition precision used in a learning process carried out by the prosody recognition subsection 53 can be taken as a reference.

As described above, the acoustic-analysis section 52 carries out internal processing in order to find a characteristic quantity (or a relative pitch change) to be used in a prosody recognition process.

By referring to a flowchart shown in FIG. 14, the following description explains processing carried out by the voice recognition apparatus 11 in order to recognize a phoneme of a voice and a prosody of the voice.

As shown in the figure, the flowchart begins with a step S1 at which the voice-signal input section 31 receives a voice signal, passing on the voice signal to the prosody recognition section 32 and the voice recognition section 33.

Then, at the next step S2, the voice recognition section 33 recognizes the voice signal received from the voice-signal input section 31 in order to produce text data and supplies the text data to the result selection section 34.

Figure 15:
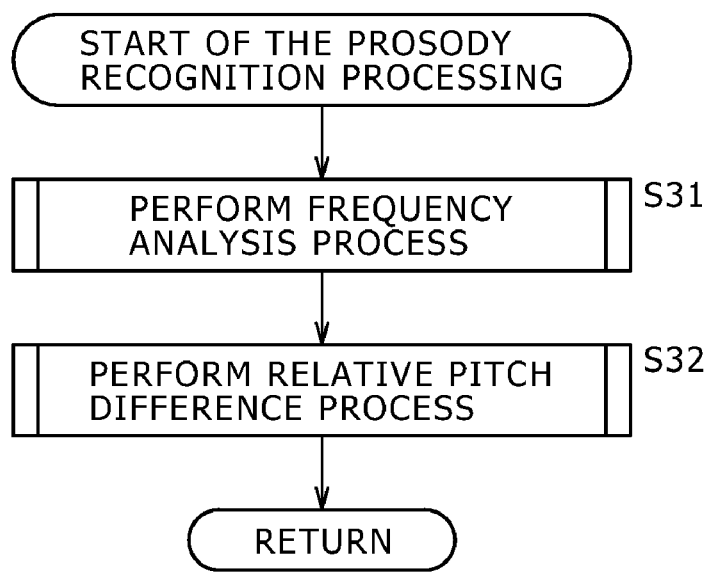
FIG. 15 shows a flowchart to be referred to in description of processing carried out by the prosody recognition section in order to recognize a prosody of a voice.

At a step S3, the prosody recognition section 32 carries out a prosody recognition process to be explained by referring to a flowchart shown in FIG. 15.

Then, at the next step S4, the result selection section 34 receives the text data from the voice recognition section 33 as a voice-data recognition result and a prosody recognition result from the prosody recognition section 32, producing a result of determination as to whether or not the voice-data recognition result received from the voice recognition section 33 matches a special word stored in the special-word storage section 35.

If the determination result produced in the process carried out at the step S4 indicates that the voice-data recognition result received from the voice recognition section 33 does not match any special word stored in the special-word storage section 35, the flow of the voice/prosody recognition processing represented by the flowchart goes on to a step S5. At the step S5, the result selection section 34 supplies the voice-data recognition result received from the voice recognition section 33 to the recognition-result output section 36 as it is without appending the prosody recognition result received from the prosody recognition section 32 to the voice recognition result. Finally, the execution of the voice/prosody recognition processing represented by the flowchart is ended.

If the determination result produced in the process carried out at the step S4 indicates that the voice-data recognition result received from the voice recognition section 33 matches a special word stored in the special-word storage section 35, on the other hand, the flow of the voice/prosody recognition processing represented by the flowchart goes on to a step S6. At the step S6, the result selection section 34 appends the prosody recognition result received from the prosody recognition section 32 to the voice-data recognition result received from the voice recognition section 33 and supplies the voice-data recognition result to the recognition-result output section 36 along with the prosody recognition result. Finally, the execution of the voice/prosody recognition processing represented by the flowchart is ended.

For example, it is also possible to provide a configuration in which the prosody recognition section 32 carries out a prosody recognition process in order to determine one of four utterance types for each input word. The fourth utterance type is referred to as another utterance type other than the three utterance types described earlier, i.e., the affirmation, denial and doubt utterance types. If the prosody recognition section 32 outputs the other utterance type to the result selection section 34, the result selection section 34 supplies only a result received from the voice recognition section 33 as the result of the voice recognition process to the recognition-result output section 36. If the prosody recognition section 32 outputs one of the affirmation, denial and doubt utterance types to the result selection section 34, on the other hand, the result selection section 34 appends the utterance type received from the prosody recognition section 32 to the result received from the voice recognition section 33 as the result of the voice recognition process and supplies the result of the voice recognition process along with the appended utterance type to the recognition-result output section 36. In this case, at the step S4, the result selection section 34 receives a voice recognition result from the voice recognition section 33 and a prosody recognition result from the prosody recognition section 32 in the same way as what described above. Instead of producing a result of determination as to whether or not the voice recognition result received from the voice recognition section 33 matches a special word stored in the special-word storage section 35, however, the result selection section 34 produces a result of determination as to whether or not the prosody recognition result received from the prosody recognition section 32 is the other utterance type. If the determination result produced in the process carried out at the step S4 indicates that the prosody recognition result received from the prosody recognition section 32 is the other utterance type, the flow of the voice/prosody recognition processing represented by the flowchart goes on to the step S5. If the determination result produced in the process carried out at the step S4 indicates that the prosody recognition result received from the prosody recognition section 32 is not the other utterance type, on the other hand, the flow of the voice/prosody recognition processing represented by the flowchart goes on to the step S6.

By referring to a flowchart shown in FIG. 15, the following description explains processing carried out by the prosody recognition section 32 at the step S3 of the flowchart shown in FIG. 14 in order to recognize a prosody of a voice.

As shown in FIG. 15, the flowchart begins with a step S31 at which the prosody recognition section 32 carries out a frequency analysis process to be described later by referring to a flowchart shown in FIG. 16.

Then, at the next step S32, the prosody recognition section 32 carries out a relative pitch difference computation process to be described later by referring to a flowchart shown in FIG. 17. Finally, the flow of the prosody recognition processing represented by the flowchart shown in FIG. 15 goes on to the step S4 of the flowchart shown in FIG. 14 by way of the step S3.

Figure 16:
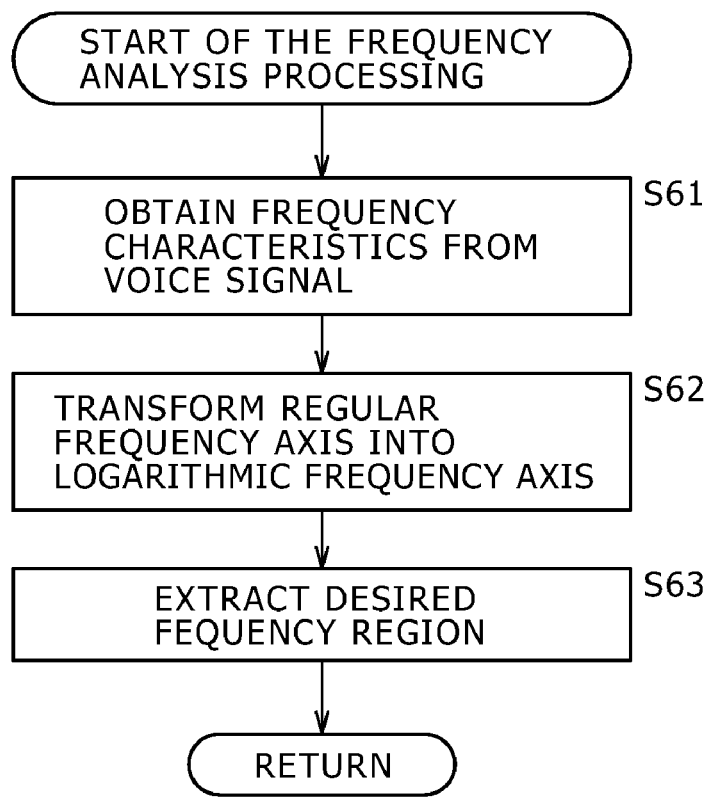
FIG. 16 shows a flowchart to be referred to in description of frequency analysis processing.

By referring to a flowchart shown in FIG. 16, the following description explains the frequency analysis processing carried out by the frequency-characteristic analysis section 61 at the step S31 of the flowchart shown in FIG. 15.

As shown in FIG. 16, the flowchart begins with a step S61 at which the time-to-frequency transformation section 81 employed in the frequency-characteristic analysis section 61 carries out a time-frequency conversion process such as an FFT analysis in order to transform an input voice signal from a signal varying in the time domain into a signal varying in the frequency domain. The signal varying in the frequency domain shows a general frequency characteristic, which is then supplied to the logarithm transformation section 82.

Then, at the step S62, the logarithm transformation section 82 transforms the frequency axis of the general frequency characteristic received from the time-to-frequency transformation section 81 into an axis having a logarithmic scale in order to transform the general frequency characteristic into a frequency characteristic over a logarithmic frequency axis. The logarithm transformation section 82 then supplies the frequency characteristic over a logarithmic frequency axis to the frequency-range extraction section 83 employed in the frequency-characteristic analysis section 61.

Then, at the step S63, the frequency-range extraction section 83 extracts only a desired frequency region portion from the frequency characteristic received from the logarithm transformation section 82 as the frequency characteristic over a logarithmic frequency axis and outputting the extracted frequency region portion as a result of the frequency-characteristic analysis to the relative pitch change computation section 62. Finally, the flow of the frequency analysis processing represented by the flowchart shown in FIG. 16 goes on to the step S32 of the flowchart shown in FIG. 15 by way of the step S31.

By carrying out the frequency analysis processing described above, the input voice signal can be subjected to a frequency analysis.

Figure 17:
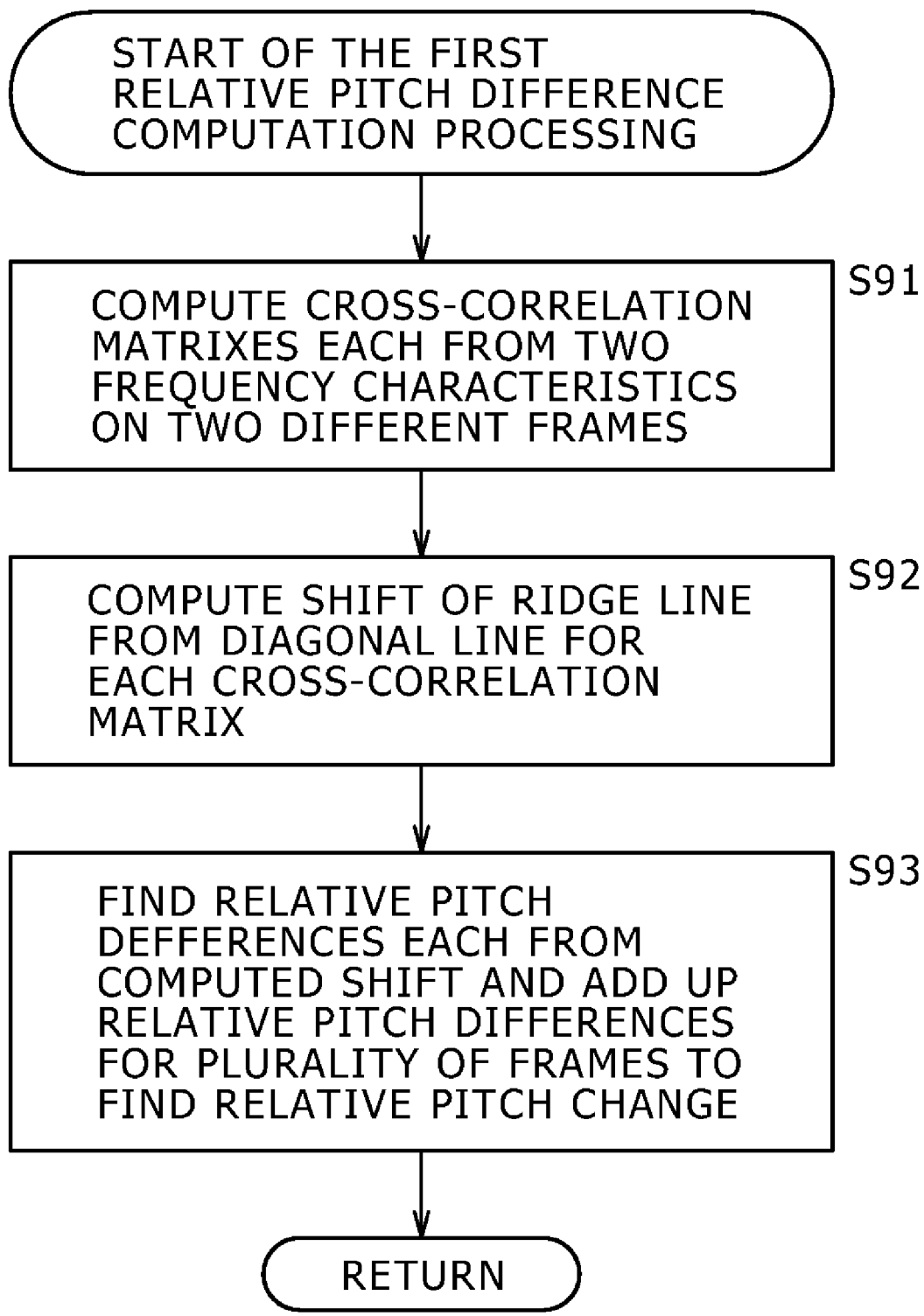
FIG. 17 shows a flowchart to be referred to in description of first relative pitch difference computation processing.

By referring to a flowchart shown in FIG. 17, the following description explains first relative pitch difference computation processing at the step S32 of the flowchart shown in FIG. 15.

As shown in FIG. 17, the flowchart begins with a step S91 at which the cross-correlation matrix computation section 101 computes a cross-correlation matrix M between frequency characteristics by making use of two frequency characteristics as two frequency characteristics of respectively two different analyzed frames selected among analyzed frames. Then, the cross-correlation matrix computation section 101 supplies the cross-correlation matrix M to the diagonal-shift computation section 102.

Subsequently, at the next step S92, the diagonal-shift computation section 102 finds a distance c shown in FIG. 11 as a shift distance between a ridge line b and a main diagonal line a in the cross-correlation matrix M. Then, the diagonal-shift computation section 102 supplies the shift distance c to the relative pitch difference computation section 103.

Subsequently, at the next step S93, the relative pitch difference computation section 103 computes a relative pitch difference between analyzed frames on the basis of a distance c received from the diagonal-shift computation section 102 as a shift distance between the ridge line b and the main diagonal line a in the cross-correlation matrix M without finding the pitch frequency of each of the analyzed frames. Then, the relative pitch difference computation section 103 cumulatively adds up relative pitch differences each computed from the two frequency characteristics of two time-wise adjacent analyzed frames for a desired number of analyzed frames in order to find a relative pitch change for a desired number of analyzed frames. Finally, the flow of the first relative pitch difference computation processing represented by the flowchart shown in FIG. 17 goes on to the step S4 of the flowchart shown in FIG. 14 by way of the step S32 of the flowchart shown in FIG. 15 and the step S3 of the flowchart shown in FIG. 14.

By carrying out the processing described above, it is possible to obtain a relative pitch change for recognizing a prosody.

Next, typical relative pitch patterns in a variety of voices are explained by referring to FIGS. 18 to 25 in order to better clarify the effectiveness of the prosody recognition method adopted by the embodiment implementing the voice recognition apparatus 11 explained earlier by referring to FIG. 1. A relative pitch pattern to be used frequently in the following description is obtained by cumulatively adding up relative pitch differences by beginning from the start point of the voice data through the entire utterance for analyzed frames in order to express relative pitch changes each beginning from the start point of the voice data on the analyzed frames as time-axis data for a sequence of successive frames as shown in FIGS. 18C to 25C, 26B and 27. A relative pitch pattern is a curve representing relative pitch changes throughout a sequence of successive analyzed frames appearing along the time axis.

The relative pitch pattern obtained in this way can be compared with a general pitch pattern representing pitch frequencies of analyzed frames. A general pitch pattern is time-axis data. In the following description, the general pitch pattern is referred to as a real pitch difference.

Figure 18A:
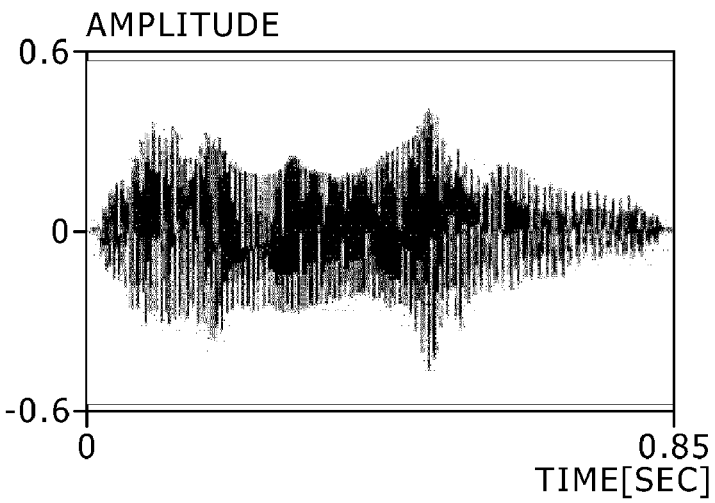
FIG. 18A is a diagram showing the waveform of a voice output by a male saying: "aiueo;"
Figure 18B:
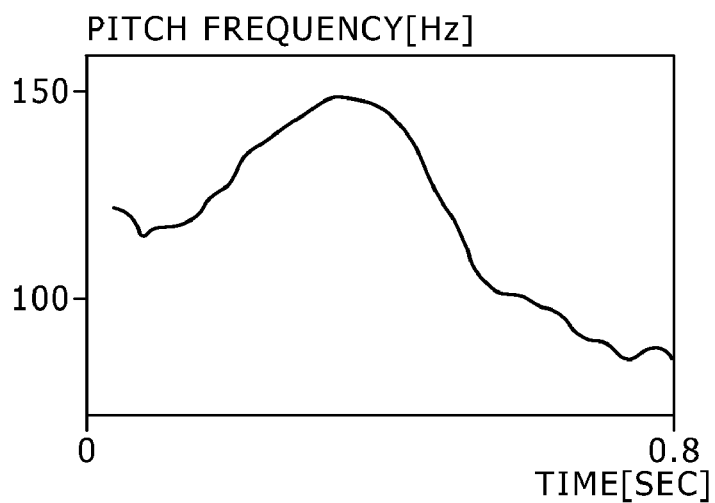
FIG. 18B is a diagram showing the real pitch pattern of the voice output by the male saying: "aiueo;"
Figure 18C:
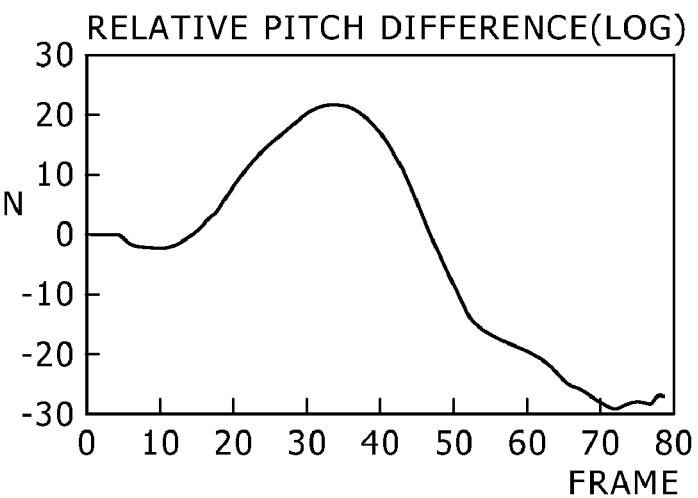
FIG. 18C is a diagram showing the relative pitch pattern of the voice output by the male saying: "aiueo;"
Figure 19A:
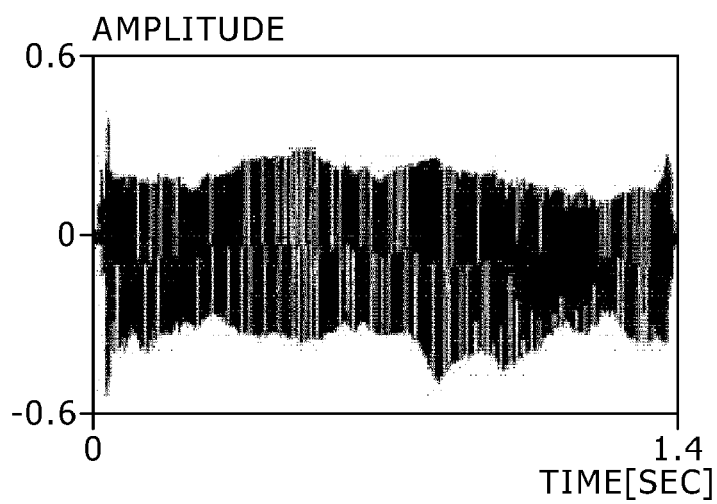
FIG. 19A is a diagram showing the waveform of a voice output by a female saying: "aiueo;"
Figure 19B:
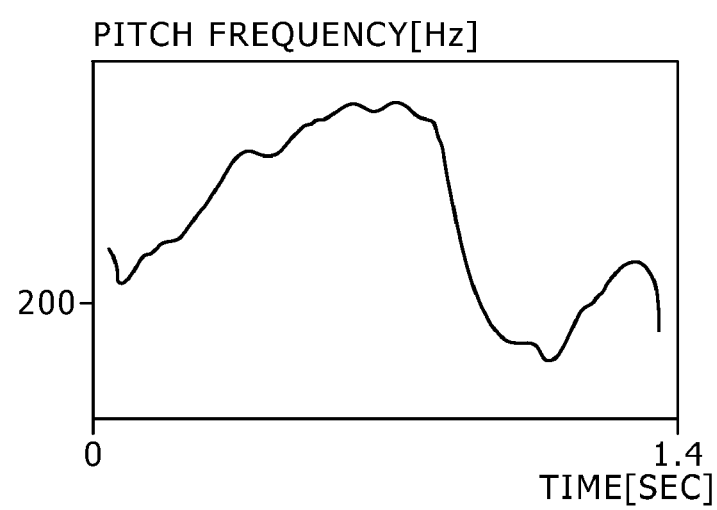
FIG. 19B is a diagram showing the real pitch pattern of the voice output by the female saying: "aiueo;"
Figure 19C:
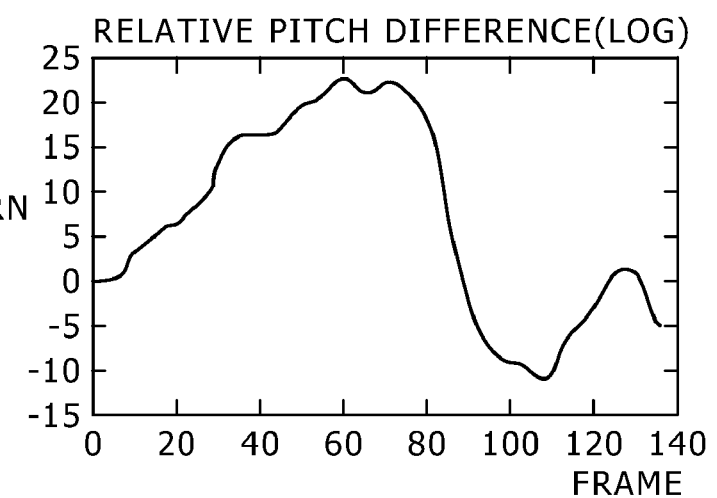
FIG. 19C is a diagram showing the relative pitch pattern of the voice output by the female saying: "aiueo;"

FIG. 18 is a set of diagrams showing the voice waveform of a voice output by a male saying: "aiueo," the real pitch pattern of the voice and a relative pitch pattern of the voice. On the other hand, FIG. 19 is a set of diagrams showing the voice waveform of a voice output by a female saying: "aiueo," the real pitch pattern of the voice and a relative pitch pattern of the voice. To be more specific, FIGS. 18A and 19A are diagrams showing the voice waveforms of voices output by a male and a female respectively. FIGS. 18B and 19B are diagrams showing the real pitch patterns of the voices output by a male and a female respectively. FIGS. 18C and 19C are diagrams showing the relative pitch patterns of the voices output by a male and a female respectively.

By referring to FIGS. 20 to 25, the following description explains waveforms, real pitch patterns and relative pitch patterns of voices for the word 'ung' actually intended as a reply expressing an affirmation, the word 'uung' actually intended as a reply expressing a denial or the word 'ung?' actually intended as a reply expressing a doubt in an ordinary situation in the case of a text 'ung' output by the voice recognition section 33 as a voice recognition result.

By referring to FIGS. 20 to 22, the following description explains cases in each of which the voice is output normally.

Figure 21A:
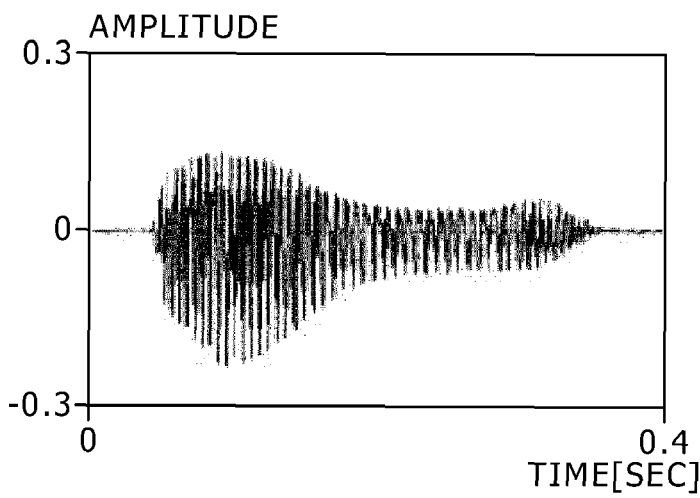
FIG. 21A is a diagram showing the waveform of a normal voice output by the male to say the word 'uung' expressing a denial reply.
Figure 21B:
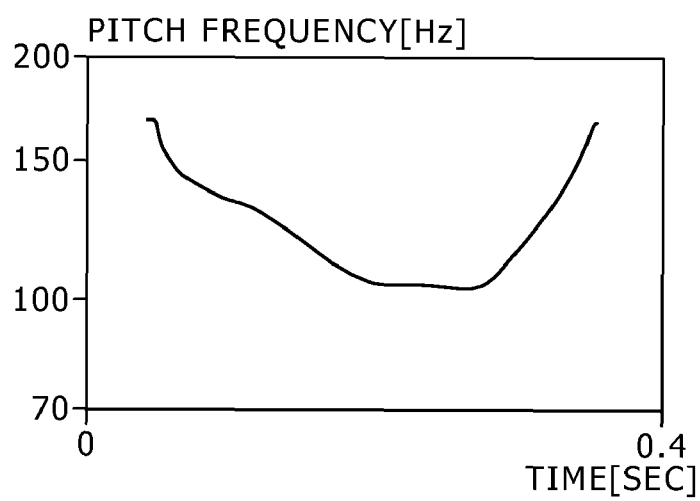
FIG. 21B is a diagram showing the real pitch pattern of the normal voice output by the male to say the word 'uung' expressing a denial reply.
Figure 21C:
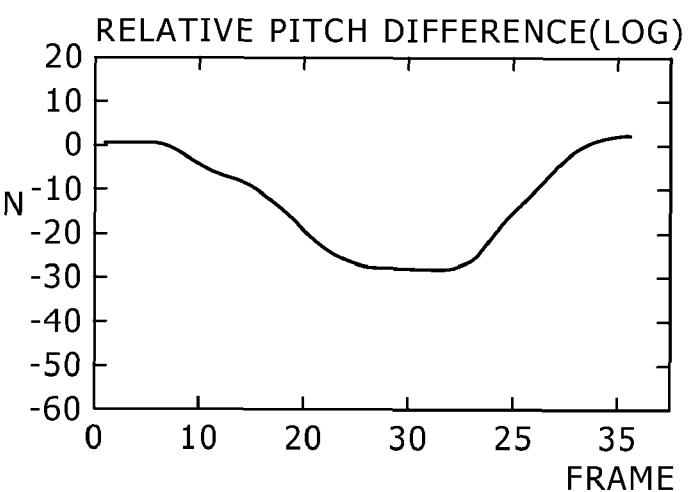
FIG. 21C is a diagram showing the relative pitch pattern of the normal voice output by the male to say the word 'uung' expressing a denial reply.

To be more specific, FIG. 20 is a set of diagrams showing a waveform, a real pitch pattern and a relative pitch pattern for the word 'ung' actually intended as a reply expressing an affirmation. FIG. 21 is a set of diagrams showing a waveform, a real pitch pattern and a relative pitch pattern for the word 'uung' actually intended as a reply expressing a denial. FIG. 22 is a set of diagrams showing a waveform, a real pitch pattern and a relative pitch pattern for the word 'ung?' actually intended as a reply expressing a doubt. To describe them in other words, FIGS. 20A, 21A and 22A are diagrams showing the voice waveforms of voices expressing the affirmation, denial and doubt replies respectively. FIGS. 20B, 21B and 22B are diagrams showing the real pitch patterns of the voices expressing the affirmation, denial and doubt replies respectively. FIGS. 20C, 21C and 22C are diagrams showing the relative pitch patterns of the voices expressing the affirmation, denial and doubt replies respectively.

As is obvious from FIGS. 20 to 22, the heights of the voices are difficult to distinguish clearly from each other by merely making use the waveforms shown in FIGS. 20A, 21A and 22A. By making use of the real pitch patterns shown in FIGS. 20B, 21B and 22B or the relative pitch patterns shown in FIGS. 20C, 21C and 22C as patterns found by carrying out the processing described earlier, however, the heights of the voices can be distinguished clearly from each other.

Figure 23A:
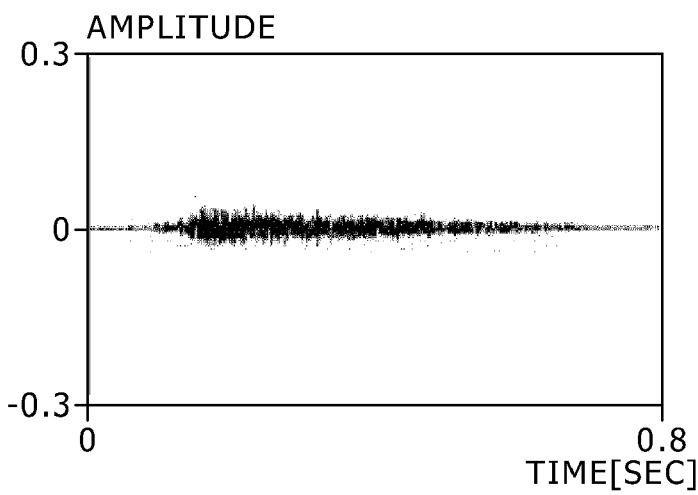
FIG. 23A is a diagram showing the waveform of a whispering voice output by the male to say the word 'ung' expressing an affirmation reply.
Figure 23B:
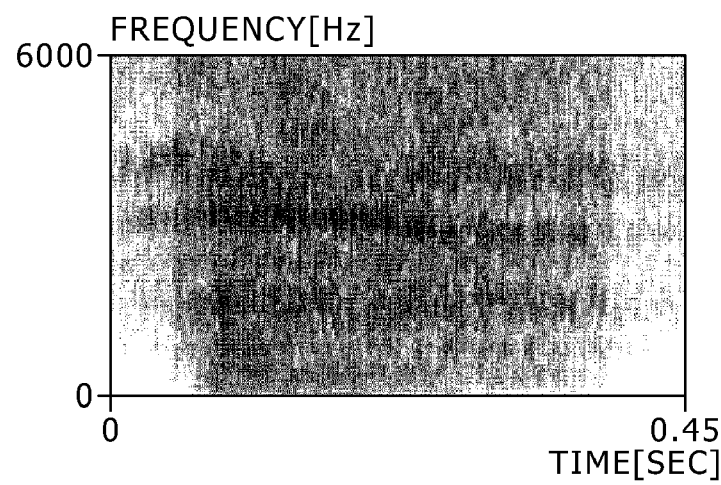
FIG. 23B is a diagram showing the spectrogram of the whispering voice output by the male to say the word 'ung' expressing an affirmation reply.
Figure 23C:
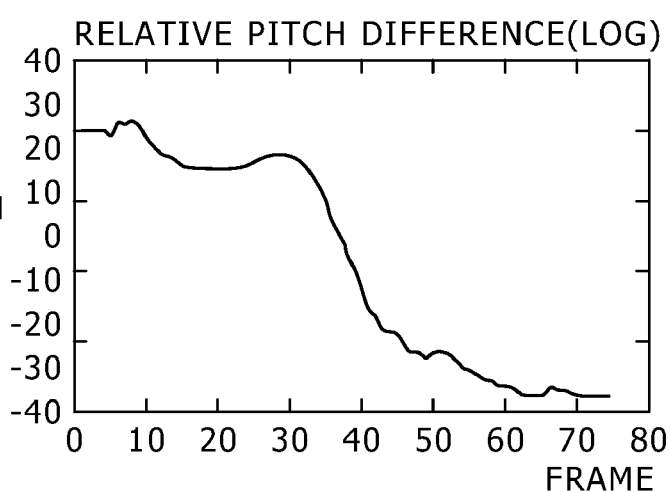
FIG. 23C is a diagram showing the relative pitch pattern of the whispering voice output by the male to say the word 'ung' expressing an affirmation reply.
Figure 24A:
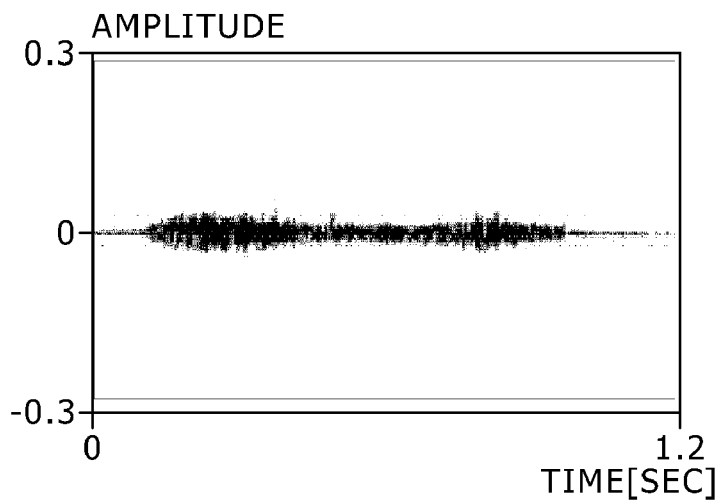
FIG. 24A is a diagram showing the waveform of a whispering voice output by the male to say the word 'uung' expressing a denial reply.
Figure 24B:
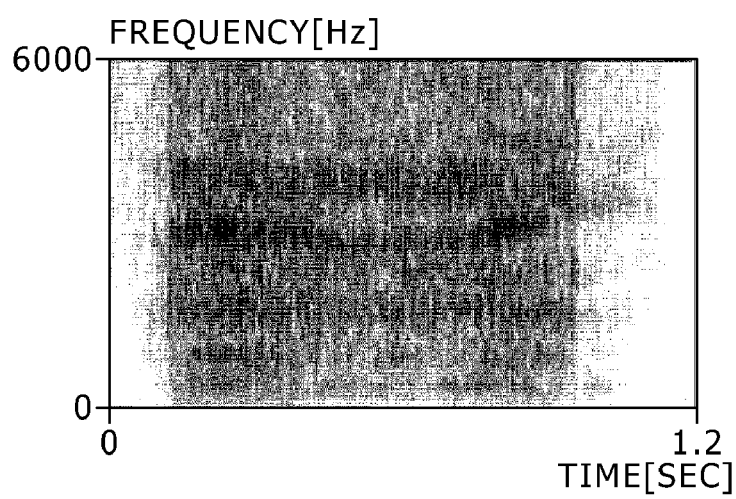
FIG. 24B is a diagram showing the spectrogram of the whispering voice output by the male by the male to say the word 'uung' expressing a denial reply.
Figure 24C:
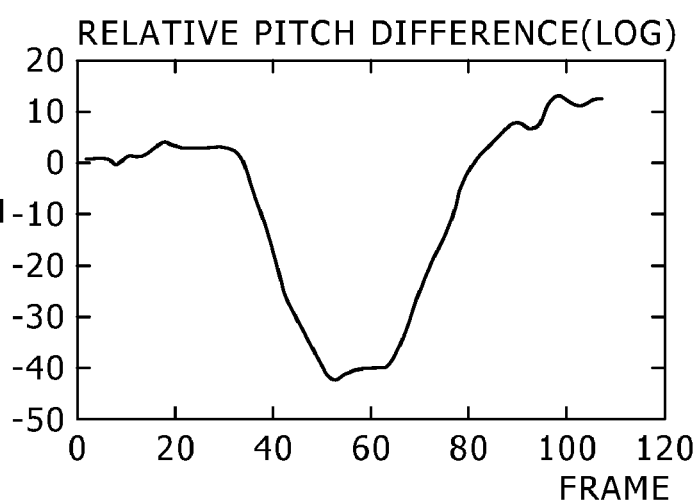
FIG. 24C is a diagram showing the relative pitch pattern of the whispering voice output by the male to say the word 'uung' expressing a denial reply.
Figure 25A:
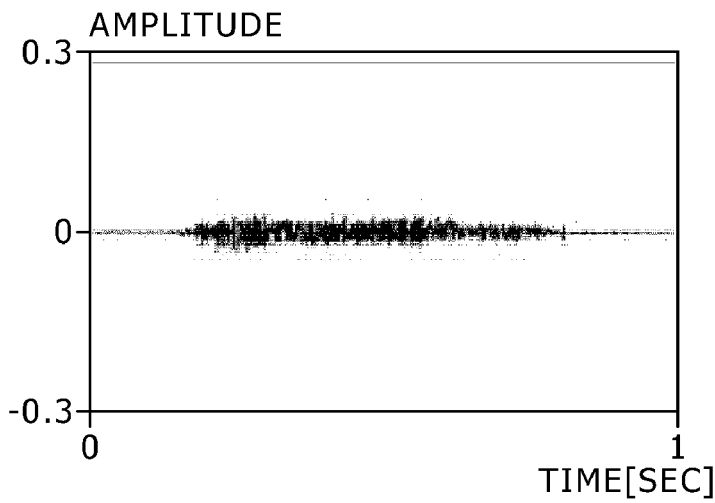
FIG. 25A is a diagram showing the waveform of a whispering voice output by the male to say the word 'ung?' expressing a doubt reply.
Figure 25B:
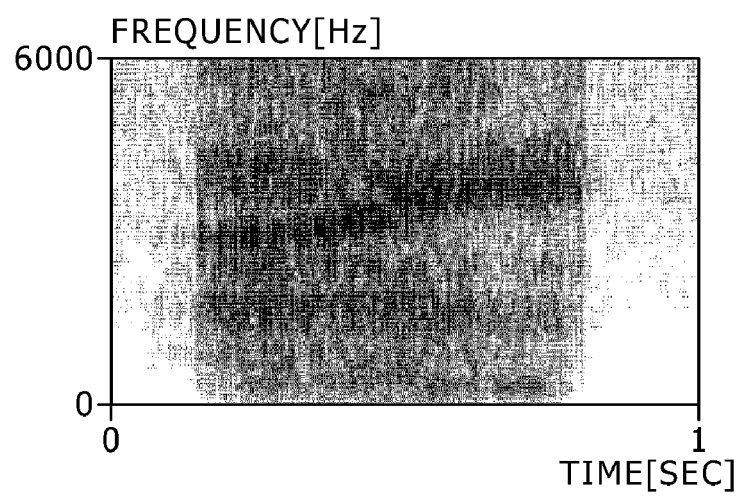
FIG. 25B is a diagram showing the spectrogram of the whispering voice output by the male to say the word 'ung?' expressing a doubt reply.
Figure 25C:
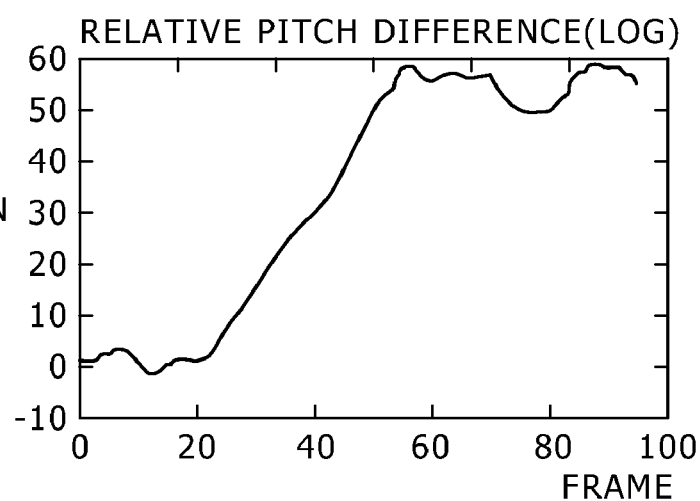
FIG. 25C is a diagram showing the relative pitch pattern of the whispering voice output by the male to say the word 'ung?' expressing a doubt reply.

By referring to FIGS. 23 to 25, the following description explains cases in each of which the voice is a whispering voice. To be more specific, FIG. 23 is a set of diagrams showing a waveform, a spectrogram and a relative pitch pattern for the word 'ung' actually intended as a reply expressing an affirmation. FIG. 24 is a set of diagrams showing a waveform, a spectrogram and a relative pitch pattern for the word 'uung' actually intended as a reply expressing a denial. FIG. 25 is a set of diagrams showing a waveform, a spectrogram and a relative pitch pattern for the word 'ung?' actually intended as a reply expressing a doubt. To describe them in other words, FIGS. 23A, 24A and 25A are diagrams showing the voice waveforms of voices expressing the affirmation, denial and doubt replies respectively. FIGS. 23B, 24B and 25B are diagrams showing the spectrograms of the voices expressing the affirmation, denial and doubt replies respectively. FIGS. 23C, 24C and 25C are diagrams showing the relative pitch patterns of the voices expressing the affirmation, denial and doubt replies respectively.

As shown in the spectrograms of FIGS. 23B, 24B and 25B, in the case of a whispering voice, in a region including general pitch frequency components, sufficient characteristics may not be grasped. It is thus very difficult to extract a pitch frequency.

As described earlier, however, the prosody recognition section 32 employed in the voice recognition apparatus 11 directly finds a relative pitch difference from a difference in harmonic component between two frequency characteristics each serving as an object of observation. Thus, as is obvious from FIGS. 23C, 24C and 25C, the changes of the heights of the whispering voices can be properly grasped.

To put it concretely, in the case of the word 'ung' intended as a reply expressing an affirmation, the relative pitch pattern thereof is a declining pattern as shown in FIG. 23C. In the case of the word 'uung' intended as a reply expressing a denial, the relative pitch pattern thereof is a pattern declining and then rising as shown in FIG. 24C. In the case of the word 'ung?' intended as a reply expressing a doubt, the relative pitch pattern thereof is a rising pattern as shown in FIG. 25C. On the basis of these differences in relative pitch pattern, it is possible to distinguish three utterance types (or utterance intention of the uttering speaker), that is, the affirmation, denial and doubt utterance types from each other for the special word 'ung' expressed by a whispering voice or the like as a word, the real pitch pattern of which is difficult to detect. It is thus possible to carry out a prosody recognition process with a high degree of precision on the basis of the prosody characteristic of the input voice.

In accordance with the method described above, a relative pitch difference (or a curve representing relative pitch changes) is determined on the basis of a shift caused by a harmonic structure as a shift representing a distance by which a ridge line connecting matrix elements corresponding to peaks in the harmonic structure is shifted from the main diagonal line of a cross-correlation matrix between the two frequency characteristics of respectively two analyzed frames observed at two different times respectively. In accordance with a typical method for determining a relative pitch difference (or a relative pitch change), at least a set of points on the two frequency characteristics respectively is determined and then a relative pitch difference (or a relative pitch change) is determined on the basis of a distance by which a straight line connecting two such sets or at least one such set is shifted from the main diagonal line of a cross-correlation matrix between the two frequency characteristics.

By adopting the typical method described above, a relative pitch difference (or a relative pitch change) can be determined on the basis of a reference different from a distance by which a ridge line is shifted from the main diagonal line of a cross-correlation matrix. To put it concretely, for example, attention is paid only to N-order harmonic peaks of two frequency characteristics or to the positions of special valleys in the two frequency characteristics as opposed to such peaks.

By carrying out such a process, it is possible to obtain a relative pitch change to be used in a prosody recognition process. Thus, by carrying out a prosody recognition process making use of a relative pitch change between two frequency characteristics observed at two different times respectively, a robust prosody recognition process can be carried out for a case in which the pitch frequency is difficult to extract in the past. Examples of the case are a case in which the effect of noises or the like is big and the case of a whispering voice or the case of a voice with a low-pitch property.

By the way, if a prosody recognition process is carried out by finding a relative pitch change in accordance with the method described above, there is inadvertently raised a problem caused by a case in which a correct recognition process may not be performed on either of a silence segment and an unvoiced region, which are included in a voice segment of an uttered voice serving as an object of recognition.

Figure 26A:
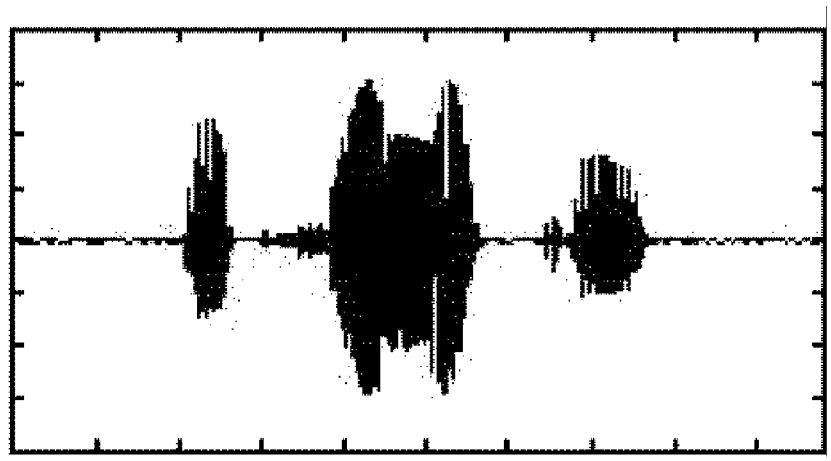
FIG. 26A is a diagram showing the waveform a voice saying: "utsumuku;"
Figure 26B:
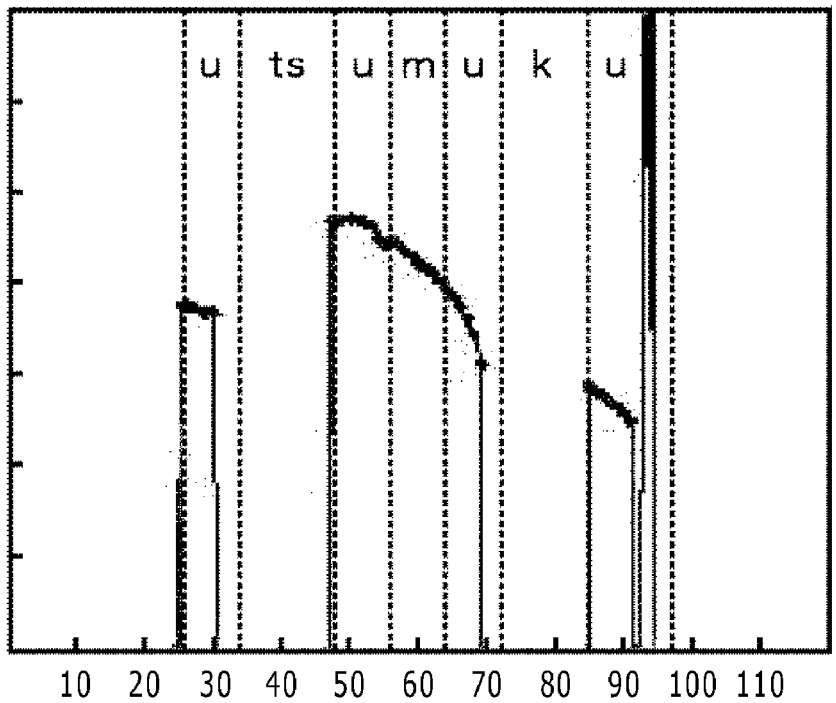
FIG. 26B is a diagram showing the real pitch pattern of the voice saying: "utsumuku;"

By referring to FIG. 26, the following description explains a prosody recognition process carried out on a voice saying: "utsumuku" as a preparation for description of another embodiment implementing the voice recognition apparatus 11 shown in FIG. 1 as an embodiment for solving the above problem. FIG. 26A is a diagram showing the waveform the voice saying: "utsumuku" whereas FIG. 26B is a diagram showing a real pitch pattern for the voice.

As shown in FIG. 26A, the waveform of the voice saying: "utsumuku" includes unvoiced sound portions, i.e., a portion corresponding to the alphabetical characters 'ts' of the Japanese syllable 'tsu' and a portion corresponding to the alphabetical character 'k' of the Japanese syllable 'ku.' Unlike vocal cords, in the unvoiced sound portions, there is no vibration. Thus, the unvoiced sound portions do not have a pitch frequency.

If the method of finding a relative pitch change from two different frequency characteristics as described above is applied to such a waveform, an improper result is obtained due to the unvoiced sound portions. By referring to FIG. 27, the following description explains a case in which an improper result is obtained due to unvoiced sound portions.

Figure 27:
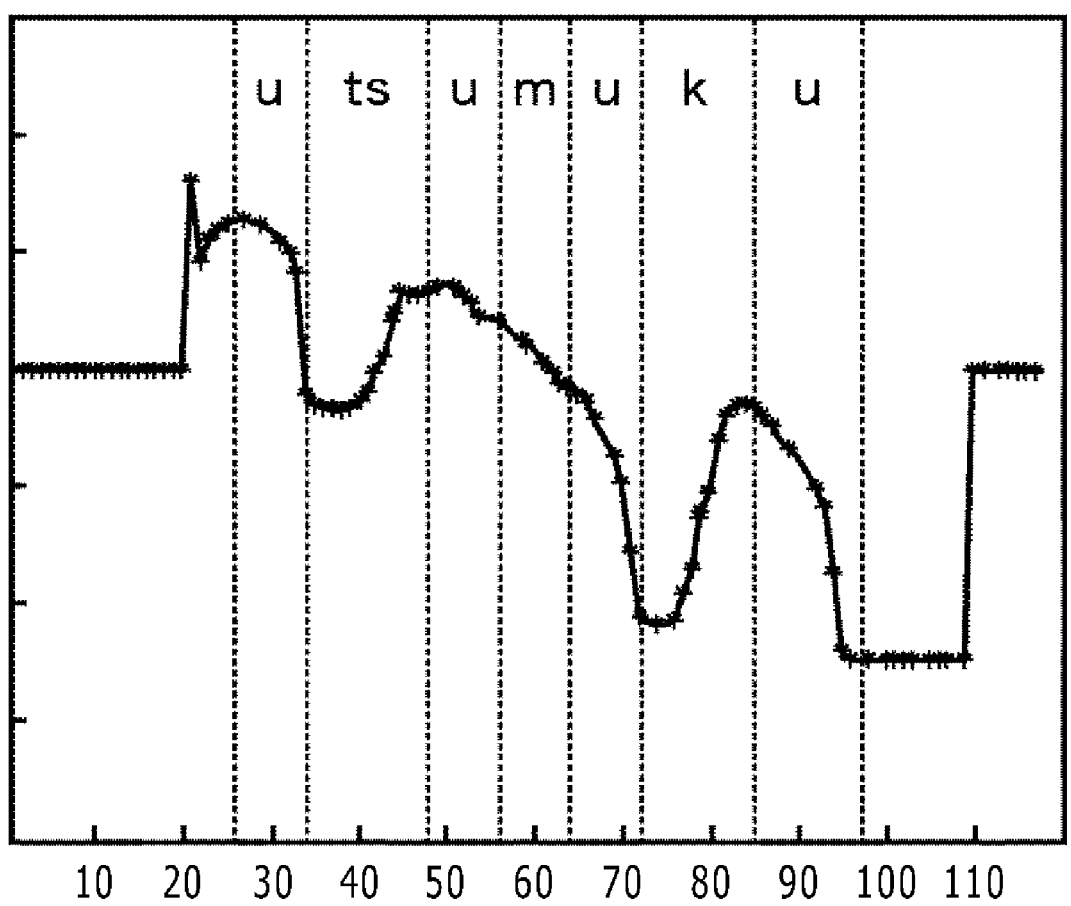
FIG. 27 is a diagram showing a first typical relative pitch pattern detected by the relative pitch change computation section shown in FIG. 9 as the relative pitch pattern of the voice saying: "utsumuku;"

FIG. 27 is a diagram showing a relative pitch pattern detected by making use of a cross-correlation matrix computed from two different frequency characteristics.

As described earlier, a relative pitch pattern is obtained by cumulatively adding up relative pitch differences by beginning from the start point of the voice data through the entire utterance for analyzed frames in order to express relative pitch changes each beginning from the start point of the voice data on the analyzed frames as time-axis data for a sequence of successive frames.

Also as explained above, the waveform of the voice saying: "utsumuku" includes unvoiced sound portions, i.e., a portion corresponding to the alphabetical characters 'ts' of the Japanese syllable 'tsu' and a portion corresponding to the alphabetical character 'k' of the Japanese syllable 'ku.' Unlike vocal cords, in the unvoiced sound portions, there is no vibration. As shown in FIG. 27, in comparison with the real pitch pattern shown in FIG. 26B, in the relative pitch pattern detected by making use of a cross-correlation matrix obtained from two different frequency characteristics, a relation between pitches (or the voice heights) before and after the unvoiced sound portion corresponding to the alphabetical characters 'ts' as well as a relation between pitches before and after the unvoiced sound portion corresponding to the alphabetical character 'k' are not extracted correctly.

This is because, in the implementation of the method for finding a relative pitch change as described above, one of the two different frequency characteristics or both the two different frequency characteristics are frequency characteristics of unvoiced sound portions so that, by making use of a cross-correlation matrix obtained from the two different frequency characteristics, a proper relative pitch difference is not obtained.

That is to say, from two frequency characteristics on two frames with respectively frame numbers of 59 and 68 before and after a portion included in the word 'utsumuku' as a portion other than a unvoiced sound portion, a correct cross-correlation matrix can be obtained as shown in FIG. 28. Thus, the shift distance of a ridge line from the main diagonal line in the cross-correlation matrix has a proper value. From a frequency characteristic on a frame with a frame number of 68 before a specific unvoiced sound portion corresponding to the character 'k' and a frequency characteristic on a frame with a frame number of 77 after the specific unvoiced sound portion, on the other hand, an incorrect cross-correlation matrix is obtained as shown in FIG. 29. Thus, the shift distance of a ridge line from the main diagonal line in the cross-correlation matrix does not have a proper value.

In order to obtain a correct cross-correlation matrix for an unvoiced sound portion, it is preferable to have a fixed frequency characteristic as one of the two different frequency characteristics from which a cross-correlation matrix is to be computed in order to detect a correlation.

To put it concretely, for example, a cross-correlation matrix is obtained by making use of a frequency characteristic prepared in advance as a frequency characteristic to serve as a template and a frequency characteristic acquired from an input voice signal. In this way, a correct cross-correlation matrix can be obtained even for an unvoiced sound portion. In the following description, a frequency characteristic prepared in advance as a frequency characteristic to serve as a template is referred to as a template frequency characteristic.

FIG. 30 is a block diagram showing a functional configuration of a relative pitch change computation section 151 used as a substitute for the relative pitch change computation section 62 shown in FIG. 2. The relative pitch change computation section 151 is a unit for computing a cross-correlation matrix by making use of a template frequency characteristic as one of two frequency characteristics. As shown in FIG. 30, the relative pitch change computation section 151 employs a template frequency characteristic storage section 161, a cross-correlation matrix computation section 162, the diagonal-shift computation section 102 and the relative pitch difference computation section 103. The diagonal-shift computation section 102 and the relative pitch difference computation section 103 are identical with their respective counterparts employed in the relative pitch change computation section 62 as shown in FIG. 9. The cross-correlation matrix computation section 162 serves as a substitute for the cross-correlation matrix computation section 101 employed in the relative pitch change computation section 62 as shown in FIG. 9. The cross-correlation matrix computation section 162 is a unit for computing a cross-correlation matrix from two frequency characteristics, one of which is a template frequency characteristic stored in the template frequency characteristic storage section 161 as a fixed frequency characteristic. The function of the cross-correlation matrix computation section 162 can be implemented by hardware or execution of software.

For example, the template frequency characteristic stored in the template frequency characteristic storage section 161 can be a pseudo frequency characteristic, which has a typical pitch frequency of 300 Hz as the frequency of the fundamental and exhibits harmonic components with magnitudes decreasing linearly from the magnitude of the fundamental.

Figure 31:
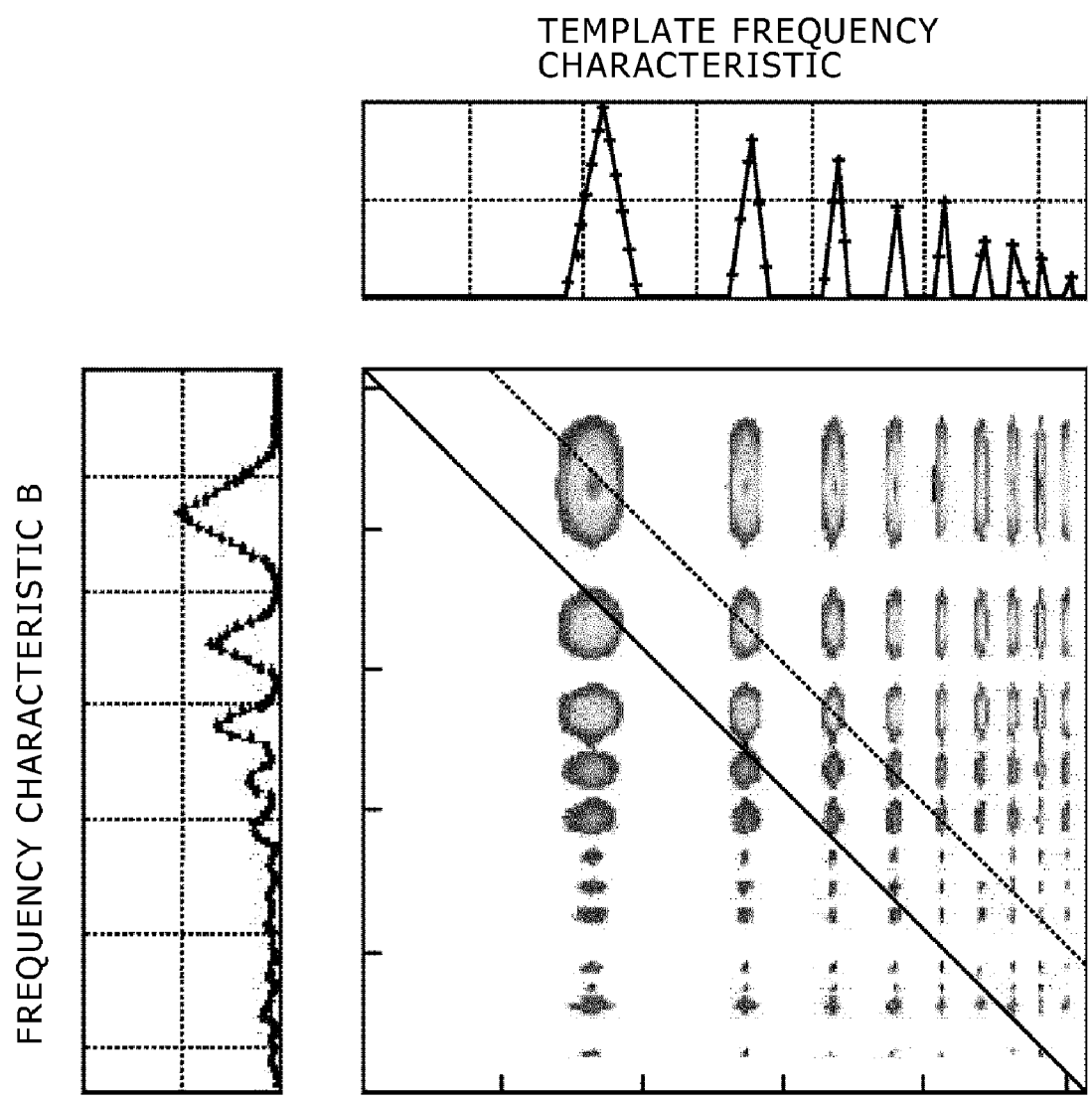
FIG. 31 is a diagram showing a graphical expression of elements composing a cross-correlation matrix output by the relative pitch change computation section shown in FIG. 30.

The cross-correlation matrix computation section 162 computes a cross-correlation matrix like one shown in FIG. 31 from two frequency characteristics, one of which is the template frequency characteristic stored in the template frequency characteristic storage section 161 as a fixed frequency characteristic. The functions of the diagonal-shift computation section 102 and the relative pitch difference computation section 103 are identical with those of their respective counterparts employed in the relative pitch change computation section 62 as shown in FIG. 9. That is to say, the diagonal-shift computation section 102 finds a shift distance between a ridge line and the main diagonal line in the cross-correlation matrix shown in FIG. 31. Then, the relative pitch difference computation section 103 computes a relative pitch difference on the basis of the shift distance. Finally, the relative pitch difference computation section 103 cumulatively adds up relative pitch differences in order to find a relative pitch difference.

In a word, the relative pitch change computation section 151 shown in FIG. 30 finds a relative pitch difference by making use of a cross-correlation matrix computed from a template frequency characteristic stored in the template frequency characteristic storage section 161 and a frequency characteristic of an analyzed frame.

As described above, instead of finding a relative pitch difference between a time-wise preceding analyzed frame and a time-wise succeeding analyzed frame, a relative pitch difference is found as a pitch frequency difference relative to the pitch frequency of the template frequency characteristic. Thus, even if the waveform of a voice includes an unvoiced sound portion, it is possible to prevent the continuity of the relative pitch pattern from becoming improper in regions before and after the unvoiced sound portion.

Figure 32:
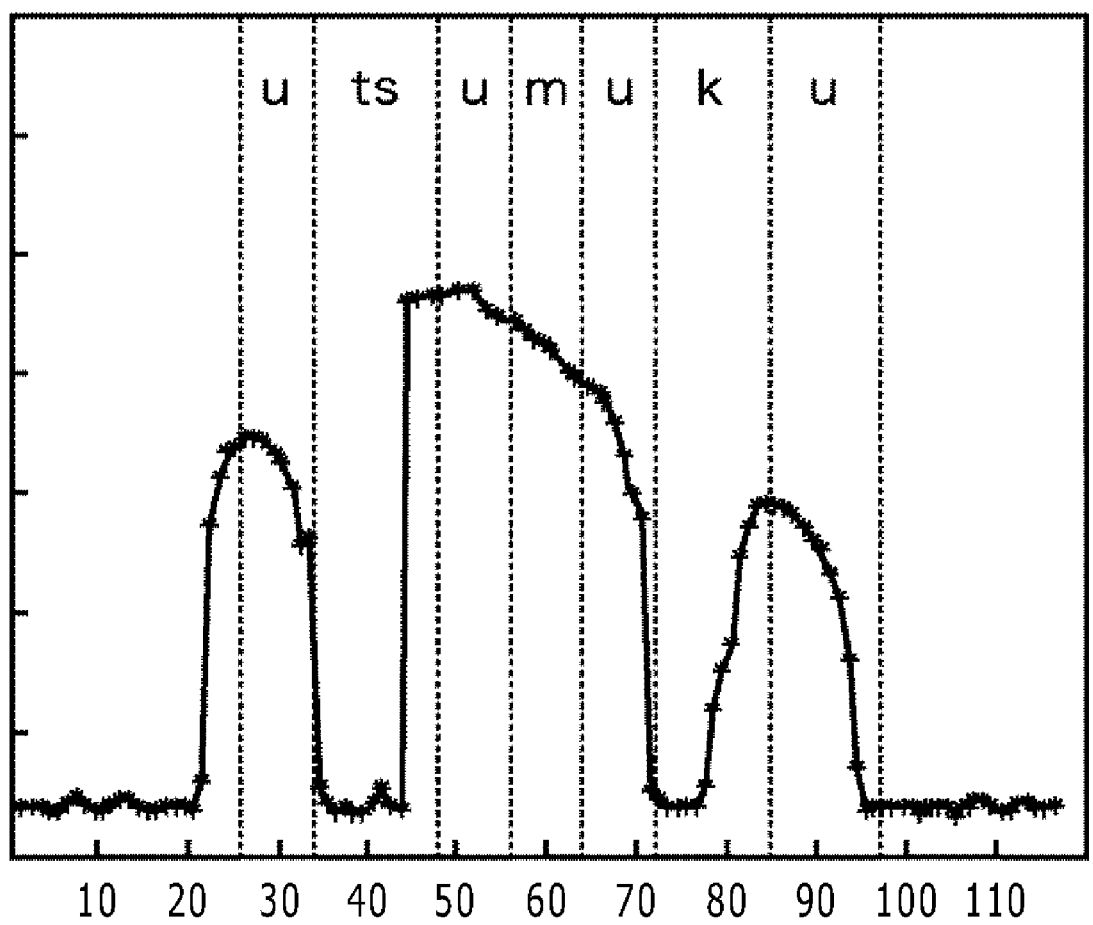
FIG. 32 is a diagram showing a second typical relative pitch pattern detected by the relative pitch change computation section shown in FIG. 30 as the relative pitch pattern of the voice saying: "utsumuku;"

FIG. 32 is a diagram showing a relative pitch pattern found as a result of a process carried out by the relative pitch change computation section 151. If the relative pitch pattern shown in FIG. 32 is compared with the relative pitch pattern shown in FIG. 26, it will become obvious that the process carried out by the relative pitch change computation section 151 results in no improper continuity of the relative pitch pattern in regions before and after the unvoiced sound portion so that the no-portion portions can each be subjected to a prosody recognition process, which is carried out in order to recognize a prosody, as a no-proper segment.

In addition, it is possible to provide a configuration in which the template frequency characteristic storage section 161 is used for storing a plurality of aforementioned template frequency characteristics. In this configuration, from the template frequency characteristics stored in the template frequency characteristic storage section 161, it is possible to select one matching the feature of the input voice and/or the feature of the frequency characteristic of the analyzed frame as a template frequency characteristic to be used in the process to compute a cross-correlation matrix in conjunction with the frequency characteristic of the analyzed frame.

To put it concretely, let us assume that the template frequency characteristic storage section 161 is used for storing a plurality of template frequency characteristics having different pitch frequencies such as 100 Hz, 300 Hz and 500 Hz. In this case, the relative pitch difference between the frequency characteristic of the analyzed frame and each template frequency characteristic is found. Then, it is preferable to take a specific relative pitch difference as the relative pitch difference between the frequency characteristic of the analyzed frame and one of the template frequency characteristics. The specific relative pitch difference is a relative pitch difference having the smallest absolute value among the found relative pitch differences.

By finding a relative pitch difference by adoption of the method described above, the relative pitch difference can be found with a higher degree of precision even for a variety of input voices having much varying voice heights as is the case with male and female voices with big differences in voice height as shown in FIGS. 18B and 19B.

By referring to a flowchart shown in FIG. 33, the following description explains second relative pitch difference computation processing carried out by the relative pitch change computation section 151 at the step S32 of the flowchart shown in FIG. 15 in order to find a relative pitch difference on the basis of a cross-correlation matrix computed from two frequency characteristics, one of which is a fixed template frequency characteristic.

As shown in the figure, the flowchart begins with a step S121 at which the cross-correlation matrix computation section 162 employed in the relative pitch change computation section 151 computes a cross-correlation matrix between a template frequency characteristic stored in the template frequency characteristic storage section 161 and the frequency characteristic of an input analyzed frame determined in advance from the template frequency characteristic and the frequency characteristic. Then, the cross-correlation matrix computation section 162 supplies the cross-correlation matrix to the diagonal-shift computation section 102.

Subsequently, at the next step S122, the diagonal-shift computation section 102 finds a distance c shown in FIG. 11 as a shift distance between a ridge line b and the main diagonal line a in the cross-correlation matrix. Then, the diagonal-shift computation section 102 supplies the shift distance c to the relative pitch difference computation section 103.

Subsequently, at the step S123, the relative pitch difference computation section 103 computes a relative pitch difference between the template frequency characteristic and the frequency characteristic of an analyzed frame on the basis of a distance c received from the diagonal-shift computation section 102 as a shift distance between the ridge line b and the main diagonal line a in the cross-correlation matrix without finding the pitch frequency of the analyzed frame. Then, the relative pitch difference computation section 103 cumulatively adds up relative pitch differences between adjacent analyzed frames in order to find a relative pitch change for a desired number of analyzed frames. Finally, the flow of the first relative pitch difference computation processing represented by the flowchart shown in FIG. 17 goes on to the step S4 of the flowchart shown in FIG. 14 by way of the step S32 of the flowchart shown in FIG. 15 and the step S3 of the flowchart shown in FIG. 14.

By carrying out the processing described above, the relative pitch change to be used in a prosody recognition process as a characteristic quantity can be properly found even for a voice including an unvoiced sound portion.

By virtue of the present invention, changes in voice height can be grasped even for a case in which the effect of noises or the like is big and the case of a whispering voice or the case of a voice with a low-pitch property. Thus, a voice recognition process can be carried out with a high degree of reliability on the basis of the prosody characteristic of the input voice.

That is to say, by virtue of the present invention, a prosody recognition process can be carried out on the basis of a relative pitch change obtained by merely comparing the template frequency characteristic with the frequency characteristic of an analyzed frame without finding the pitch frequency of the analyzed frame.

In other words, in order to find a relative pitch change from two frequency characteristics, one of the two frequency characteristics can be a fixed frequency characteristic referred to as a template frequency characteristic.

Thus, even in the case of an input voice including a silence segment and/or an unvoiced portion, the relative pitch pattern does not become discontinuous so that a proper relative pitch pattern can be found in the same way as a pitch pattern found by detection of an ordinary pitch frequency.

That is to say, by taking a fixed frequency characteristic referred to as a template frequency characteristic as one of the two frequency characteristics from which a relative pitch change is found, a prosody recognition process based on the relative pitch change can be carried out for a variety of input voices.

In addition, it is possible to provide a configuration in which the template frequency characteristic storage section 161 is used for storing a plurality of template frequency characteristics. In this configuration, from the template frequency characteristics, it is possible to select one matching the feature of the input voice and/or the feature of the frequency characteristic of the analyzed frame.

To put it concretely, let us assume that the template frequency characteristic storage section 161 is used for storing a plurality of template frequency characteristics having different pitch frequencies such as 100 Hz, 300 Hz and 500 Hz. In this case, the relative pitch difference between the frequency characteristic of the analyzed frame and each template frequency characteristic is found. Then, it is preferable to take a specific relative pitch difference as the relative pitch difference between the frequency characteristic of the analyzed frame and one of the template frequency characteristics. The specific relative pitch difference is a relative pitch difference having the smallest absolute values among the found relative pitch differences.

By finding a relative pitch difference by adoption of the method described above, the relative pitch difference can be found with a higher degree of precision even for a variety of input voices having much varying voice heights as is the case with male and female voices with big differences in voice height.

It is needless to say that the present invention can be applied to an apparatus different from the voice recognition apparatus 11 explained earlier by referring to FIG. 1. That is to say, the present invention can of course be applied to a configuration in which a prosody is recognized by adoption of the method described above.

The series of processes described previously can also be carried out by execution of software. If the series of processes described above is carried out by execution of software, programs composing the software can be installed into a computer embedded in dedicated hardware, a general-purpose personal computer or the like from typically a recording medium. In this case, the computer or the personal computer like one shown in FIG. 34 serves as the voice recognition apparatus 11 explained earlier by referring to FIG. 1. A general-purpose personal computer is a personal computer, which can be made capable of carrying out a variety of functions by installing a variety of programs into the personal computer.

In the personal computer shown in FIG. 34, a CPU (Central Processing Unit) 211 carries out various kinds of processing by execution of programs stored in a ROM (Read Only Memory) 212 or programs loaded from a storage section 218 into a RAM (Random Access Memory) 213. The RAM 213 is also used for properly storing various kinds of information such as data demanded in execution of the processing.

The CPU 211, the ROM 212 and the RAM 213 are connected to each other by a bus 214, which is also connected to an input/output interface 215.

The input/output interface 215 is connected to an input section 216, an output section 217, the storage section 218 cited above and a voice-signal acquisition section 219. The input section 216 includes a keyboard and a mouse whereas the output section 217 includes a display unit and a speaker. The storage section 218 includes a hard disk. The voice-signal acquisition section 219 is a microphone of an interface with an external apparatus.

The input/output interface 215 is also connected to a drive 220 on which the recording medium cited above is mounted. The recording medium can be a magnetic disk 231, an optical disk 232, a magneto-optical disk 233 or a semiconductor memory 234. As described above, a computer program to be executed by the CPU 211 is installed from the recording medium into the storage section 218.

As explained earlier, the series of processes described previously can also be carried out by execution of software. If the series of processes described above is carried out by execution of software, programs composing the software can be installed into a computer embedded in dedicated hardware, a general-purpose personal computer or the like from typically the recording medium into the storage section 218.

The aforementioned recording medium for recording programs to be installed into a computer or a general-purpose personal computer as programs to be executed by the computer or the general-purpose personal computer respectively is a removable recording medium provided to the user separately from the main unit of the personal computer as shown in FIG. 34. Examples of the removable recording mediums also each referred to as a package medium include the magnetic disk 231 such as a flexible disk, the optical disk 232 such as a CD-ROM (Compact Disk-Read Only Memory) or a DVD (Digital Versatile Disk), the magneto-optical disk 233 such as an MD (Mini-Disk) as well as the semiconductor memory 234

It is worth noting that, in this specification, steps of each program stored in a recording medium described above can be carried out not only in a pre-prescribed order along the time axis, but also concurrently or individually.

It is also to be noted that the technical term 'system' used in this specification implies the configuration of a confluence including a plurality of apparatus.

It is also worth noting that implementations of the present invention are by no means limited to the embodiments described above. That is to say, changes within a range not deviating from essentials of the present invention can be made to the embodiments.

In addition, it should be understood by those skilled in the art that a variety of modifications, combinations, sub-combinations and alterations may occur, depending on design requirements and other factors insofar as they are within the scope of the appended claims or the equivalents thereof.

What is claimed is:

1. A method of operating a speech recognition apparatus for recognizing input speech on the basis of a prosody characteristic of said speech, said method comprising the steps of:
    acquiring said input speech;
    finding, via an acoustic analysis section of said speech recognition apparatus, a relative pitch change on the basis of a shift of a ridge line, which is drawn in a cross-correlation matrix computed from a first frequency characteristic seen at each frame time of said input speech and a second frequency characteristic determined in advance as a straight line connecting matrix elements corresponding to peaks of said first and second frequency characteristics, from a main diagonal line of said cross-correlation matrix; and
    carrying out, via a prosody recognition section of said speech recognition apparatus, a prosody recognition process on the basis of said found relative pitch change in order to produce a result of said prosody recognition process.

2. A non-transitory, computer-readable storage medium storing a program that, when executed by a processor of a computer, causes the computer to perform a method for recognizing input speech on the basis of a prosody characteristic of said speech, said method comprising the steps of:
    acquiring said input speech;
    finding a relative pitch change on the basis of a shift of a ridge line, which is drawn in a cross-correlation matrix computed from a first frequency characteristic seen at each frame time of said input speech and a second frequency characteristic determined in advance as a straight line connecting matrix elements corresponding to peaks of said first and second frequency characteristics, from a main diagonal line of said cross-correlation matrix; and
    carrying out a prosody recognition process on the basis of said found relative pitch change in order to produce a result of said prosody recognition process.

3. A speech recognition apparatus for recognizing input speech on the basis of a prosody characteristic of said speech, said speech recognition apparatus comprising:
    a voice speech acquisition section configured to acquire said input voice speech;
    an acoustic analysis section configured to find a relative pitch change on the basis of a shift of a ridge line, which is drawn in a cross-correlation matrix computed from a first frequency characteristic seen at each frame time of said input speech and a second frequency characteristic determined in advance as a straight line connecting matrix elements corresponding to peaks of said first and second frequency characteristics, from a main diagonal line of said cross-correlation matrix; and
    a prosody recognition section configured to carry out a prosody recognition process on the basis of said relative pitch change in order to produce a result of said prosody recognition process.

4. The speech recognition apparatus according to claim 3, said speech recognition apparatus further having a frequency-characteristic storage section for storing said second frequency characteristic.

5. The speech recognition apparatus according to claim 4, wherein
    said frequency-characteristic storage section is used for storing a plurality of said second frequency characteristics, and
    said acoustic analysis section finds said relative pitch change on the basis of a proper second frequency characteristic selected among said second frequency characteristics stored in said frequency-characteristic storage section in accordance with said input speech.

6. The speech recognition apparatus according to claim 3, said speech recognition apparatus further having:
    a speech recognition section for carrying out a speech recognition process, which is based on a characteristic quantity obtained as a result of an acoustic analysis carried out on said input speech, in order to produce a result of said speech recognition process;
    a special-word storage section for storing predetermined special words; and
    a result selection section for collating said result of said speech recognition process with said special words, wherein
    if said result of said speech recognition process matches one of said special words, said result selection section outputs a final recognition result obtained by integrating said result of said speech recognition process with said result of said prosody recognition process, and
    if said result of said speech recognition process does not match any one of said special words, said result selection section outputs said result of said speech recognition process as a final recognition result.

* * * * *